(12) United States Patent
Kallfass et al.

(10) Patent No.: US 10,696,550 B2
(45) Date of Patent: Jun. 30, 2020

(54) DEVICE FOR GENERATING OXYGEN FROM PEROXIDES IN IONIC LIQUIDS

(71) Applicant: DIEHL AVIATION GILCHING GMBH, Gilching (DE)

(72) Inventors: Christoph Kallfass, Schwaebisch Hall (DE); Florian Groche, Munich (DE); Fritz E. Kuehn, Garching (DE); Andreas Hinterberger, Munich (DE)

(73) Assignee: Diehl Aviation Gilching GmbH, Gilching (DE)

( * ) Notice: Subject to any disclaimer, the term of this patent is extended or adjusted under 35 U.S.C. 154(b) by 99 days.

(21) Appl. No.: 15/982,036

(22) Filed: May 17, 2018

(65) Prior Publication Data

US 2019/0016596 A1   Jan. 17, 2019

(30) Foreign Application Priority Data

Jul. 14, 2017 (EP) .................................. 17 181 388

(51) Int. Cl.
*C01B 13/02* (2006.01)
*B01J 31/02* (2006.01)
(Continued)

(52) U.S. Cl.
CPC .......... *C01B 13/0214* (2013.01); *A62B 19/00* (2013.01); *A62B 21/00* (2013.01);
(Continued)

(58) Field of Classification Search
CPC ............. C01B 13/0214; C01B 13/0211; C01B 13/0296; B01J 31/0298; B01J 31/0284; B01J 23/007; A62B 21/00; A62B 19/00
See application file for complete search history.

(56) References Cited

U.S. PATENT DOCUMENTS

| 2,035,896 A | 3/1936 | Kerwin |
| 3,955,931 A | 5/1976 | Thompson |

(Continued)

FOREIGN PATENT DOCUMENTS

| DE | 19602149 A1 | 7/1997 |
| DE | 102009041065 | 3/2011 |

(Continued)

OTHER PUBLICATIONS

Extended European Search Report for International Application No. 17181388.4 dated Jan. 18, 2018, 10 pages.
(Continued)

*Primary Examiner* — Andrew J. Oyer
(74) *Attorney, Agent, or Firm* — Laurence A. Greenberg; Werner H. Stemer; Ralph E. Locher

(57) ABSTRACT

The present invention is directed to a device for generating oxygen, comprising at least one oxygen source, at least one ionic liquid, and at least one metal salt, wherein the oxygen source comprises a peroxide compound, the ionic liquid is in the liquid state at least in a temperature range from −10° C. to +50° C., and the metal salt has an organic and/or an inorganic anion, and comprises one single metal or two or more different metals. The present invention also relates to charge components for filling or refilling the devices, and to the use of ionic liquids as dispersants or solvents for the reaction participants.

13 Claims, 24 Drawing Sheets

Oxygen release from different amounts of UHP through $MnCl_2$ in 8MIMOAc.

(51) Int. Cl.
*A62B 21/00* (2006.01)
*A62B 19/00* (2006.01)
*B01J 23/00* (2006.01)

(52) U.S. Cl.
CPC ......... B01J 23/007 (2013.01); B01J 31/0284 (2013.01); B01J 31/0298 (2013.01); C01B 13/0211 (2013.01); C01B 13/0296 (2013.01)

(56) References Cited

U.S. PATENT DOCUMENTS

| | | | | |
|---|---|---|---|---|
| 4,548,730 | A | * | 10/1985 | Koslow ............... C01B 13/0296 128/202.26 |
| 5,443,798 | A | | 8/1995 | Kerrebrock |
| 8,147,760 | B1 | | 4/2012 | Huvard et al. |
| 8,455,421 | B2 | * | 6/2013 | Seddon ................... C11D 3/28 134/40 |
| 2011/0017209 | A1 | * | 1/2011 | Monzyk ................ A61M 16/10 128/202.26 |
| 2011/0073331 | A1 | | 3/2011 | Xu |

FOREIGN PATENT DOCUMENTS

| | | |
|---|---|---|
| EP | 0867201 A2 | 9/1998 |
| JP | S6177604 A | 4/1986 |
| JP | 61236602 A | 10/1986 |
| JP | S61227903 A | 10/1986 |
| JP | S61236602 A | 10/1986 |
| JP | S6227307 | 2/1987 |
| WO | 8602063 | 4/1986 |
| WO | 9743210 | 11/1997 |

OTHER PUBLICATIONS

Fluck, et al. "New Notations in the Periodic Table" International Union of Pure and Applied Chemistry Inorganic Chemistry Division, Pure&Appl. Chem., vol. 60, No. 3, pp. 431-436, 1988.

Gaston P. Barreto et al., "Effect of ionic liquid on the thermal decomposition of cy clic organic peroxides", Arabian Journal of Chemistry, Jun. 1, 2016, 10 pages.

Nadia Guajardo et al., "Applications of Liquid/Liquid Biphasic Oxidations by Hydrogen Peroxide with Iconic Liquids or Deep Eutectic Solvents", Chempluschem, vol. 82, No. 2, Dec. 22, 2016, pp. 165-176.

\* cited by examiner

Fig. 1: Oxygen release from different amounts of UHP through $MnCl_2$ in BMIMOAc.

Fig. 2: Reaction temperature for the decomposition of different amounts of UHP.

Fig. 3: Oxygen release from different amounts of UHP through Mn(OAc)$_3$ in BMIMOAc.

Fig. 4: Reaction temperature for the decomposition of different amounts of UHP.

Fig. 5: Oxygen release from 2g UHP in different ionic liquids by catalytic amounts of IrCl$_3$.

Fig. 6: Oxygen release from 2g UHP in different ionic liquids by catalytic amounts of Co(OAc)$_2$.

Fig. 7: Oxygen release from 2g UHP in 1g BMIMOAc by different inorganic metal salts.

Fig. 8: Oxygen release from 2 g UHP in 1 g BMIMOAc by different inorganic metal salts.

Fig. 9: Oxygen release from 2 g UHP in 1 g BMIMOAc by different organic metal compounds.

Fig. 10: Oxygen release from 2 g UHP in 1 g BMIMOAc by different organic metal compounds.

Fig. 11: Oxygen evolution from 2 g UHP using different concentrations of MnCl$_2$ in BMIMOAc.

Fig. 12: Oxygen evolution from 5 g UHP using different concentrations of Mn(OAc)$_2$ in BMIMOAc.

Fig. 13: Oxygen liberation from mixtures of SPC and UHP in $MMIMPO_4Me_2$.

Fig. 14: Oxygen liberation from SPC in BMIMOAc.

Fig. 15: Oxygen liberation from mixtures of SPC and UHP in BMIMOAc.

Fig. 16: Oxygen liberation from SPC in BMIMOAc.

Fig. 17: Oxygen evolution from 10 g UHP using UHP as powder and as tablets.

Fig. 18: Oxygen release from 2 g UHP in 1 g of an ionic liquid by different insoluble/partially soluble inorganic metal salts.

Fig. 19: Oxygen release from 2 g UHP in 1 g of an ionic liquid by different insoluble/partially soluble organic metal compounds.

DEVICE FOR GENERATING OXYGEN FROM PEROXIDES IN IONIC LIQUIDS

This application claims priority to European Patent Application No. 17181388.4 filed Jul. 14, 2017, the entire contents of which is incorporated herein by reference.

TECHNICAL FIELD

The present invention relates to devices for generating oxygen, and to charge components for such devices. Furthermore, the present invention relates to the use of ionic liquids as dispersants or solvents in compositions for generating oxygen.

BACKGROUND

Humans cannot exist without oxygen. In many environments, however, oxygen supply is insufficient or there is a risk of emergency situations involving a shortage of oxygen, for example in submarines, in mines, in space capsules, and also in air planes. Air pressure decreases with increasing flight altitude, and at cruising altitudes of many aircrafts, in particular long-range aircrafts, sufficient oxygen for human beings is no longer available. Therefore, the aircraft cabins are pressurized in order to ensure sufficient oxygen supply. In case of a sudden de-pressurization of an aircraft cabin, oxygen masks must be available, which supply oxygen to crew and passengers until the aircraft reaches a flight level where sufficient oxygen is available.

The oxygen which is provided by these emergency systems is typically produced by so-called "chlorate candles" or "oxygen candles". These chemical oxygen generators contain chlorates or perchlorates as an oxygen source, as well as various additives such as fuels, catalysts, binders and moderators. Chlorate candles are often in the form of cylindrical rods, i.e. they have a shape similar to candles. Chlorate candles are disclosed, for example, in WO 97/43210.

Known chlorate candles require high temperatures at which the oxygen production takes place. Namely, in chlorate candles the decomposition reaction requires a temperature of about 350° C. for initiation, and the oxygen is released at temperatures between 450° C. and 700° C. Therefore, effective heat insulation of chlorate candles is required, resulting in a weight and size penalty. Furthermore, decomposition of chlorates and perchlorates tends to produce toxic side products, in particular chlorine, which must be removed from the oxygen stream, thus additionally adding size and weight. Furthermore, there is a risk of system failure. In chlorate candles the reaction zone is normally liquid, i.e. there is a liquid zone travelling through the candle, starting at the point of ignition. The liquid zone within the otherwise solid candle considerably destabilizes the candle such that mechanical shocks or even slight vibrations may result in separation of the candle portions, thus interrupting the heat transfer and discontinuing the chlorate or perchlorate decomposition. In such a case, oxygen production may be interrupted, although oxygen is still vitally needed.

A different type of chemical oxygen generators uses peroxides as oxygen sources, for example sodium percarbonate, sodium perborate, or an urea adduct of hydrogen peroxide. Decomposition of the peroxides yields oxygen, and the decomposition reaction can be started by contacting the peroxide compounds with an appropriate enzyme or transition metal catalyst. Chemical oxygen generators of this type are disclosed in U.S. Pat. No. 2,035,896, WO 86/02063, JPS 61227903, and DE 196 02 149.

Many known peroxide-based oxygen generators use water for providing contact between the peroxides and the catalysts. Unfortunately, water freezes at 0° C. and, therefore, no oxygen can be produced below 0° C., while some emergency systems must be operational below 0° C. Also, the decomposition of peroxides in aqueous solutions may result in vehement effervescing of the reaction mixture. As a consequence, an oxygen generating device containing a peroxide-based oxygen generating composition must have a complicated structure.

It would be beneficial to provide a solution to at least some of the problems of the prior art outlined above, and to provide a device for generating oxygen which produces breathable oxygen reliably and continuously in a wide temperature range, and preferably including subfreezing temperatures. The oxygen produced should be at a low temperature, such as below 150° C., or even lower. Desirably, the oxygen should be free from toxic or otherwise noxious components such as chlorine or carbon monoxide. It would be also beneficial to provide a device capable to produce oxygen over an extended period of time and with a significant flow rate. Further, it would be beneficial to provide a device capable to produce oxygen promptly upon demand.

SUMMARY

Exemplary embodiments of the invention include a device for generating oxygen comprising at least one reaction chamber for housing a composition for generating oxygen, the composition comprising a combination of constituents consisting of at least one oxygen source, at least one ionic liquid, and at least one metal salt, means for maintaining at least one of the oxygen source, the ionic liquid and the metal salt physically separated from the remaining constituents, means for establishing physical contact of the oxygen source, the ionic liquid and the metal salt, and means for allowing oxygen to exit the reaction chamber, wherein the metal salt comprises one single metal or two or more different metals and an organic and/or inorganic anion, and wherein the oxygen source comprises a peroxide compound.

Further exemplary embodiments of the invention include a charge component set for a device for generating oxygen as embodied by the present invention, the charge component comprising an oxygen source formulation, an ionic liquid formulation and a metal salt formulation, wherein the oxygen source formulation comprises a peroxide compound, the ionic liquid formulation is in the liquid state at least in a temperature range from −10° C. to +50° C., and the metal salt formulation comprises a metal salt which comprises one single metal or two or more different metals and an organic and/or inorganic anion.

Further exemplary embodiments of the invention include the use of an ionic liquid as a dispersant or solvent and as a heat sink in a composition for generating oxygen, the composition further comprising at least one oxygen source formulation, and at least one metal salt formulation, wherein the oxygen source formulation comprises a peroxide compound, the ionic liquid is in the liquid state at least in a temperature range from −10° C. to +50° C., and the metal salt formulation comprises a metal salt which comprises one single metal or two or more different metals and an organic and/or inorganic anion.

Further exemplary embodiments of the invention include the use of an ionic liquid for releasing oxygen from the composition for generating oxygen according to this invention.

Exemplary embodiments of the composition contained in the device for generating oxygen of the invention include a composition for generating oxygen, comprising at least one oxygen source, at least one ionic liquid, and at least one metal salt, wherein the oxygen source comprises a peroxide compound, the ionic liquid is in the liquid state at least in a temperature range from −10° C. to +50° C., and the metal salt comprises one single metal or two or more different metals and an organic and/or inorganic anion.

In exemplary embodiments the device for generating oxygen of the invention produces oxygen according to a method for generating oxygen comprising providing at least one oxygen source, providing at least one ionic liquid, providing at least one metal salt, wherein the oxygen source is a peroxide compound, the ionic liquid is in the liquid state at least in the temperature range from −10° C. to +50° C., and the metal salt comprises one single metal or two or more different metals and an organic and/or inorganic anion, and contacting the oxygen source, the ionic liquid, and the metal salt.

The invention is based on an entirely new concept, the use of ionic liquids in chemical oxygen generating compositions, methods, and devices, respectively.

Technical implementations of this inventive concept as claimed herein include a device for generating oxygen, and the use of an ionic liquid as a dispersant or solvent and/or as a heat sink in the oxygen generating composition and/or for releasing oxygen from the composition over an extended period of time and/or promptly upon demand.

Implementations of this invention further include that the composition is provided in a form specifically adapted as a charge component set for filling or refilling a device for generating oxygen according to this invention.

As can be easily understood, the constituents of the composition are the same, irrespective of which technical implementation of the invention is contemplated. Therefore, any disclosure provided for a particular implementation, such as composition, device, method or use, is analogously applicable to the other implementations of this invention.

Embodiments 1 to 109 below constitute exemplary implementations of this invention.

1. A composition for generating oxygen, comprising at least one oxygen source, at least one ionic liquid, and at least one metal salt, wherein the oxygen source comprises a peroxide compound, the ionic liquid is in the liquid state at least in a temperature range from −10° C. to +50° C., and the metal salt comprises one single metal or two or more different metals, and an organic and/or inorganic anion.

2. The composition according to embodiment 1, wherein the oxygen source and the metal salt, or the oxygen source and the ionic liquid, or the metal salt and the ionic liquid, are not in physical contact with each other.

3. The composition according to embodiment 1 or 2, wherein the oxygen source is selected from alkali metal percarbonates, alkali metal perborates, urea hydrogen peroxide, and mixtures thereof.

4. The composition according to any one of embodiments 1 to 3, wherein the oxygen source is one or more of $Na_2CO_3 \times 1.5H_2O_2$, $NaBO_3 \times 4H_2O$, $NaBO_3 \times H_2O$ and urea hydrogen peroxide.

5. The composition according to any one of embodiments 1 to 4, wherein the ionic liquid is at least one salt having a cation and an anion, wherein the cation is selected from the group consisting of imidazolium, pyrrolidinium, ammonium, pyridinium, pyrazolium, piperidinium, phosphonium, and sulfonium cations.

6. The composition according to any one of embodiments 1 to 5, wherein the ionic liquid is at least one salt having a cation and an anion, wherein the cation has at least one substituent.

7. The composition according to any one of embodiments 1 to 6, wherein the ionic liquid is at least one salt having a cation and an anion, wherein the cation is symmetrically or asymmetrically substituted.

8. The composition according to any one of embodiments 1 to 7, wherein the ionic liquid is at least one salt having a cation and an anion, wherein the anion is selected from the group consisting of dimethylphosphate, methylsulfate, ethylsulfate, trifluoromethylsulfonate, bis(trifluoromethylsulfonyl)imide, chloride, bromide, iodide, tetrafluoroborate, hexafluorophosphate, acetate, and but-3-enoate.

9. The composition according to any one of embodiments 1 to 8, wherein the ionic liquid is selected from the group consisting of 1-butyl-3-methylimidazoliumdimethylphosphate ($BMIMPO_4Me_2$), 1,3-dimethylimidazoliumdimethylphosphate ($MMIMPO_4Me_2$), 1-butyl-3-methylimidazoliumacetate (BMIMOAc), 1-ethyl-3-methylimidazoliumethylsulfate ($EMIMEtSO_4$), and tetraethylammonium but-3-enoate ($NEt_4$but-3-enoate).

10. The composition according to any one of embodiments 1 to 9, wherein the metal salt is soluble in the ionic liquid.

11. The composition according to any one of embodiments 1 to 9, wherein the metal salt is not soluble or partially soluble in the ionic liquid.

12. The composition according to any one of embodiments 1 to 11, wherein the metal salt is at least one salt containing one single metal, optionally in different oxidation states, the metal being selected from the metals belonging to groups 5 to 14 and periods 4 to 6 of the periodic table of the elements.

13. The composition according to any one of embodiments 1 to 11, wherein the metal salt comprises at least two different metals, at least one metal being selected from the metals belonging to groups 5 to 14 and periods 4 to 6 of the periodic table of the elements.

14. The composition according to any one of embodiments 1 to 13, wherein the metal salt comprises at least one cation selected from the group consisting of vanadium, chromium, manganese, iron, cobalt, copper, molybdenum, ruthenium, iridium and lead.

15. The composition according to any one of embodiments 1 to 14, wherein the metal salt comprises at least one cation selected from Co (II), Mn (II), Mn (III), Pb (II), Pb (IV), Fe (II), Fe (III), Cr (III), Cr (VI), V (II), Ru (III), Mo (VI), Ir (III), Cu (I), and Cu(II).

16. The composition according to any one of embodiments 1 to 15, wherein the metal salt is selected from the group consisting of chlorides, sulfates, carbonates, nitrates, phosphates, hydroxides, and mixtures thereof.

17. The composition according to any one of embodiments 1 to 16, wherein the metal salt is selected from the group consisting of acetates, acetylacetonates, oxalates, tartrates, citrates, and mixtures thereof.

18. The composition according to any one of embodiments 1 to 10, wherein the metal salt is at least one of $PbCl_2$, $CrCl_3$, $CoCl_2$, $CoCO_3$, $CoSO_4$, $IrCl_3$, $MnCl_2$, $VCl_2$, $KCr(SO_4)_2$, $FeCl_3$, $CuCl_2$, and hydrates thereof.

19. The composition according to any one of embodiments 1 to 10, wherein the metal salt is at least one of Mn(OAc)$_2$, Mn(OAc)$_3$, Mn (acac)$_2$, Mn(oxalate), Pb(acac)$_2$, Pb(OAc)$_2$, Pb3(citrate)$_2$, Pb(tartrate), Co(OAc)$_2$, MoO$_2$ (acac)$_2$, Ru(acac)$_3$, and hydrates thereof, with OAc meaning acetate, and acac meaning acetylacetonate.

20. The composition according to any one of embodiments 1 to 19, wherein the oxygen source is present in an amount ranging from 10 to 80 weight % of the composition, the ionic liquid is present in an amount ranging from 20 to 80 weight % of the composition, and the metal salt is present in an amount ranging from more than 0 to 15 weight % of the composition, with all constituents of the composition adding up to 100 weight %.

21. The composition according to any one of embodiments 1 to 20, wherein the composition is provided as a kit of at least two physically separated components, each component lacking at least one of the oxygen source, the ionic liquid, and the metal salt.

22. The composition according to embodiment 21, wherein one component comprises a metal salt formulation and an ionic liquid formulation, and the other component comprises an oxygen source formulation.

23. The composition according to embodiment 21, wherein one component comprises an oxygen source formulation and a metal salt formulation, and the other component comprises an ionic liquid formulation.

24. The composition according to embodiment 21, wherein one component comprises an oxygen source formulation and an ionic liquid formulation, and the other component comprises a metal salt formulation.

25. The composition according to embodiment 21, wherein the kit comprises a third component, one component comprising an oxygen source formulation, the other component comprising a ionic liquid formulation, and the third component comprising a metal salt formulation.

26. The composition according to any one of embodiments 1 to 25, wherein at least one of the oxygen source and the metal salt is in the form of powders or is in the form of at least one powder compact.

27. The composition according to embodiment 26, wherein the at least one powder compact has been compacted with a pressure in the range of from 1 to 220 MPa, or from 10 to 200 MPa, or from 50 to 150 MPa.

28. The composition according to any one of embodiments 21 to 27, wherein the kit comprises at least two different metal salts and/or at least two peroxide compounds which differ in degree of compaction.

29. The composition according to any one of embodiments 1 to 19, wherein the metal salt is dissolved or dispersed in the ionic liquid.

30. A method for generating oxygen comprising providing at least one oxygen source, providing at least one ionic liquid, providing at least one metal salt, wherein the oxygen source is a peroxide compound, the ionic liquid is in the liquid state at least in the temperature range from −10° C. to +50° C., and the metal comprises one single metal or two or more different metals, and an organic and/or inorganic anion, and contacting the oxygen source, the ionic liquid, and the metal salt.

31. The method according to embodiment 30, wherein the oxygen source and the ionic liquid are provided as a first component, the metal salt is provided as a second component, and the step of contacting comprises mixing the first and the second components.

32. The method according to embodiment 30, wherein the metal salt and the ionic liquid are provided as a first component, the oxygen source is provided as a second component, and the step of contacting comprises mixing the first and the second component.

33. The method according to embodiment 30, wherein the oxygen source and the metal salt are provided as a first component, the ionic liquid is provided as a second component, and the step of contacting comprises mixing the first and the second components.

34. The method according to embodiment 30, wherein the oxygen source is provided as a first component, the ionic liquid is provided as a second component, the metal salt is provided as a third component, and the step of contacting comprises mixing the first, the second, and the third components.

35. The method according to any one of embodiments 30 to 34, wherein the oxygen source is selected from alkali metal percarbonates, alkali metal perborates, urea hydrogen peroxide, and mixtures thereof.

36. The method according to any one of embodiments 30 to 35, wherein the oxygen source is one or more of Na$_2$CO$_3$× 1.5H$_2$O$_2$, NaBO$_3$×4H$_2$O, NaBO$_3$×H$_2$O, and urea hydrogen peroxide.

37. The method according to any one of embodiments 30 to 36, wherein the ionic liquid is at least one salt as defined in any one of embodiments 5 to 9.

38. The method according to any one of embodiments 30 to 37, wherein the metal salt is at least one salt as defined in any one of embodiments 10 to 19.

39. The method according to any one of embodiments 30 to 38, wherein the oxygen source is present in an amount ranging from 10 to 80 weight % of the composition, the ionic liquid is present in an amount ranging from 20 to 80 weight % of the composition, and the metal salt is present in an amount ranging from more than 0 to 15 weight % of the composition, with all constituents of the composition adding up to 100 weight %.

40. The method according to any one of embodiments 30 to 39, wherein at least one of the oxygen source and the metal salt is in the form of powder.

41. The method according to any one of embodiments 30 to 40, wherein at least one of the oxygen source and the metal salt is in the form of at least one powder compact.

42. The method according to embodiment 41, wherein the at least one powder compact has been compacted with a pressure in the range of from 1 to 220 MPa, or from 10 to 200 MPa, or from 50 to 150 MPa.

43. The method according to embodiment 41 or 42, wherein at least one of the oxygen source and the metal salt includes powder compacts having different degrees of compression.

44. The method according to any one of embodiments 30 to 43, wherein the metal salt is dispersed in the ionic liquid.

45. The method according to any one of the embodiments 30 to 39, wherein the metal salt is dissolved in the ionic liquid.

46. A device for generating oxygen comprising at least one reaction chamber for housing a composition for generating oxygen, the composition comprising a combination of constituents consisting of at least one oxygen source, at least one ionic liquid, and at least one metal salt, means for maintaining at least one of the oxygen source, the ionic liquid and the metal salt physically separated from the remaining constituents, means for establishing physical contact of the oxygen source, the ionic liquid and the metal salt, and means for allowing oxygen to exit the reaction chamber, wherein the metal salt comprises a single metal or two or more different metals, and an organic and/or inorganic anion, and wherein the oxygen source comprises a peroxide compound.

47. The device according to embodiment 46, wherein the means for allowing oxygen to exit the reaction chamber is selected from a gas permeable membrane, a frit and a molecular sieve.

48. The device according to embodiment 46 or 47, wherein the reaction chamber comprises a first compartment for receiving at least one of the oxygen source, the ionic liquid and the metal salt, and a second compartment for receiving the other constituents.

49. The device according to any one of embodiments 46 to 48, wherein the means for maintaining at least one of the oxygen source, the ionic liquid and the metal salt physically separated comprise at least one receptacle within the chamber for receiving at least one of the oxygen source, the ionic liquid and the metal salt.

50. The device according to any one of embodiments 46 to 49, wherein the means for maintaining at least one of the oxygen source, the ionic liquid and the metal salt physically separated comprise a membrane, a foil, or a glass plate between the first compartment and the second compartment.

51. The device according to any one of embodiments 46 to 50, wherein the means for establishing physical contact comprise a device for destroying the means for maintaining the constituents physically separated, and an activation mechanism for activating the device.

52. The device according to embodiment 51, wherein the device for destroying is a solid plate, a grid, or a cutting edge.

53. The device according to any one of embodiments 46 to 52, wherein the means for establishing physical contact is a syringe or a dosing mechanism.

54. The device according to any one of embodiments 46 to 53, wherein the at least one reaction chamber is placed within a container having a gas outlet.

55. The device according to embodiment 54, wherein the gas outlet comprises means for restricting gas flow.

56. The device according to any one of embodiments 46 to 55, wherein at least two reaction chambers are placed within a container, the container providing a common gas space for receiving oxygen exiting the reaction chambers.

57. The device according to any one of embodiments 46 to 56, wherein from 3 to 20 reaction chambers are placed within a container, the container providing a common gas space for receiving oxygen exiting the reaction chambers.

58. The device according to any one of embodiments 46 to 57, wherein the oxygen source is selected from alkali metal percarbonates, alkali metal perborates, urea hydrogen peroxide, and mixtures thereof.

59. The device according to any one of embodiments 46 to 58, wherein the oxygen source is one or more of $Na_2CO_3 \times 1.5H_2O_2$, $NaBO_3 \times 4H_2O$, $NaBO_3 \times H_2O$ and urea hydrogen peroxide.

60. The device according to any one of embodiments 46 to 59, wherein the ionic liquid is at least one salt having a cation and an anion, wherein the cation is selected from the group consisting of imidazolium, pyrrolidinium, ammonium, pyridinium, pyrazolium, piperidinium, phosphonium, and sulfonium cations.

61. The device according to any one of embodiments 46 to 60, wherein the ionic liquid is at least one salt having a cation and an anion, wherein the cation has at least one substituent.

62. The device according to any one of embodiments 46 to 61, wherein the ionic liquid is at least one salt having a cation and an anion, wherein the cation is symmetrically or asymmetrically substituted.

63. The device according to any one of embodiments 46 to 62, wherein the ionic liquid is at least one salt having a cation and an anion, wherein the anion is selected from the group consisting of dimethylphosphate, methylsulfate, ethylsulfate, trifluoromethylsulfonate, bis(trifluoromethylsulfonyl)imide, chloride, bromide, iodide, tetrafluoroborate, hexafluorophosphate, acetate, and but-3-enoate.

64. The device according to any one of embodiments 46 to 63, wherein the ionic liquid is selected from the group consisting of 1-butyl-3-methylimidazoliumdimethylphosphate ($BMIMPO_4Me_2$), 1,3-dimethylimidazoliumdimethylphosphate ($MMIMPO_4Me_2$), 1-butyl-3-methylimidazoliumacetate (BMIMOAc), 1-ethyl-3-methylimidazoliumethylsulfate ($EMIMEtSO_4$), and tetraethylammonium but-3-enoate ($NEt_4$but-3-enoate).

65. The device according to any one of embodiments 46 to 64, wherein the metal salt is soluble in the ionic liquid.

66. The device according to any one of embodiments 46 to 64, wherein the metal salt is not soluble or partially soluble in the ionic liquid.

67. The device according to any one of embodiments 46 to 66, wherein the metal salt is at least one salt containing one single metal, optionally in different oxidation states, the metal being selected from the metals belonging to groups 5 to 14 and periods 4 to 6 of the periodic table of the elements.

68. The device according to any one of embodiments 46 to 66, wherein the metal salt comprises at least two different metals, at least one metal being selected from the metals belonging to groups 5 to 14 and periods 4 to 6 of the periodic table of the elements.

69. The device according to any one of the embodiments 46 to 68, wherein the metal salt comprises at least one cation selected from the group consisting of vanadium, chromium, manganese, iron, cobalt, copper, molybdenum, ruthenium, iridium, and lead.

70. The device according to any one of embodiments 46 to 69, wherein the metal salt comprises at least one cation selected from Co (II), Mn (II), Mn (III), Pb (II), Pb (IV), Fe (II), Fe (III), Cr (III), Cr (VI), V (II), Ru (III), Mo (VI), Ir (III), Cu (I), and Cu(II).

71. The device according to any one of embodiments 46 to 70, wherein the metal salt is selected from the group consisting of chlorides, sulfates, carbonates, nitrates, phosphates, hydroxides, and mixtures thereof.

72. The device according to any one of embodiments 46 to 71, wherein the metal salt is selected from the group consisting of acetates, acetylacetonates, oxalates, tartrates, citrates, and mixtures thereof.

73. The composition according to any one of embodiments 46 to 65, wherein the metal salt is at least one of $PbCl_2$, $CrCl_3$, $CoCl_2$, $CoCO_3$, $CoSO_4$, $IrCl_3$, $MnCl_2$, $VCl_2$, $KCr(SO_4)_2$, $FeCl_3$, $CuCl_2$, and hydrates thereof.

74. The device according to any one of embodiments 46 to 65, wherein the metal salt is at least one of $Mn(OAc)_2$, $Mn(OAc)_3$, Mn $(acac)_2$, Mn (oxalate), Pb $(acac)_2$, Pb $(OAc)_2$, $Pb_3$ $(citrate)_2$, Pb (tartrate), $Co(OAc)_2$, Mo $O_2$ $(acac)_2$, $Ru(acac)_3$, and hydrates thereof, with OAc meaning acetate, and acac meaning acetylacetonate.

75. The device according to any one of embodiments 46 to 74, wherein the oxygen source is present in an amount ranging from 10 to 80 weight % of the composition, the ionic liquid is present in an amount ranging from 20 to 80 weight % of the composition, and the metal salt is present in an amount ranging from more than 0 to 15 weight % of the composition, with all constituents of the composition adding up to 100 weight %.

76. The device according to any one of embodiments 46 to 75, wherein at least one of the oxygen source and the metal salt is in the form of powders or is in the form of at least one powder compact.

77. The device according to embodiment 76, wherein the at least one powder compact has been compacted with a pressure in the range of from 1 to 220 MPa, or from 10 to 200 MPa, or from 50 to 150 MPa.

78. The device according to any one of embodiments 46 to 74, wherein the metal salt is dissolved or dispersed in the ionic liquid.

79. The device according to any one of embodiments 46 to 78, wherein the at least one reaction chamber comprises different compositions for generating oxygen.

80. The device according to embodiment 56 or 78, wherein at least two reaction chambers comprise different compositions for generating oxygen.

81. The device according to embodiment 79 or 80, wherein the compositions for generating oxygen differ with respect to the oxygen source and/or with respect to the ionic liquid and/or with respect to the metal salt and/or with respect to degree of compaction of the oxygen source.

82. A charge component set for a device for generating oxygen as embodied in any one of embodiments 46 to 81, the charge component set comprising an oxygen source formulation, an ionic liquid formulation, and a metal salt formulation, wherein the oxygen source formulation comprises a peroxide compound, the ionic liquid formulation is in the liquid state at least in a temperature range from −10° C. to +50° C., and the metal salt formulation comprises a metal salt, which comprises one single metal or two or more different metals, and an organic and/or inorganic anion.

83. The charge component set according to embodiment 82, wherein the peroxide compound is at least one compound as defined in embodiment 58 or 59.

84. The charge component set according to embodiment 82 or 83, wherein the ionic liquid formulation comprises an ionic liquid as defined in any one of embodiments 60 to 64.

85. The charge component set according to any one of embodiments 82 to 84, wherein the metal salt is one or more salts as defined in any one of embodiments 65 to 74.

86. The charge component set according to any one of embodiments 82 to 85, wherein the oxygen source is present in an amount ranging from 10 to 80 weight % of the composition, the ionic liquid is present in an amount ranging from 20 to 80 weight % of the composition, and the metal salt is present in an amount ranging from more than 0 to 15 weight % of the composition, with all constituents of the composition adding up to 100 weight %.

87. The charge component set according to any one of embodiments 82 to 86, wherein the set is provided as at least two physically separated components, each component lacking at least one of the oxygen source, the ionic liquid, and the metal salt.

88. The charge component set according to embodiment 87, wherein one component comprises a metal salt formulation and an ionic liquid formulation, and the other component comprises an oxygen source formulation.

89. The charge component set according to embodiment 87, wherein one component comprises an oxygen source formulation and a metal salt formulation, and the other component comprises an ionic liquid formulation.

90. The charge component set according to embodiment 87, wherein one component comprises an oxygen source formulation and an ionic liquid formulation, and the other component comprises a metal salt formulation.

91. The charge component set according to embodiment 87, wherein the set comprises a third component, one component comprising an oxygen source formulation, the other component comprising a ionic liquid formulation, and the third component comprising a metal salt formulation.

92. The charge component set according to any one of embodiments 82 to 91, wherein at least one of the oxygen source and the metal salt is in the form of powders or is in the form of at least one powder compact.

93. The charge component set according to embodiment 92, wherein the at least one powder compact has been compacted with a pressure in the range of from 1 to 220 MPa, or from 10 to 200 MPa, or from 50 to 150 MPa.

94. The charge component set according to embodiment 92 or 93, wherein the set comprises at least two different metal salts and/or at least two peroxide compounds which differ in degree of compaction.

95. The charge component set according to any one of embodiments 82 to 88, wherein the metal salt is dissolved or dispersed in the ionic liquid.

96. Use of an ionic liquid as a dispersant or solvent and as a heat sink in a composition for generating oxygen, the composition further comprising at least one oxygen source formulation, and at least one metal salt formulation, wherein the oxygen source formulation comprises a peroxide compound, the ionic liquid is in the liquid state at least in a temperature range from −10° C. to +50° C., and the metal salt formulation comprises a metal salt which comprises one single metal or two or more different metals, and an organic and/or inorganic anion.

97. The use according to embodiment 96, wherein the peroxide compound is at least one compound as defined in embodiment 58 or 59.

98. The use according to embodiment 96 or 97, wherein the ionic liquid is at least one ionic liquid as defined in any one of embodiments 60 to 64.

99. The use according to any one of embodiments 96 to 98, wherein the metal salt is one or more salts as defined in any one of embodiments 65 to 74.

100. The use according to any one of embodiments 96 to 99, wherein the oxygen source is present in an amount ranging from 10 to 80 weight % of the composition, the ionic liquid is present in an amount ranging from 20 to 80 weight % of the composition, and the metal salt is present in an amount ranging from more than 0 to 15 weight % of the composition, with all constituents of the composition adding up to 100 weight %.

101. The use according to any one of embodiments 96 to 100, wherein at least one of the oxygen source formulation and the metal salt formulation is in the form of powders or is in the form of at least one powder compact.

102. The use according to embodiment 101, wherein the at least one powder compact has been compacted with a pressure in the range of from 1 to 220 MPa, or from 10 to 200 MPa, or from 50 to 150 MPa.

103. The use according to embodiment 101 or 102, wherein the oxygen source formulation comprises at least two different peroxide compounds and/or at least two peroxide compounds which differ in degree of compaction.

104. The use according to any one of embodiments 101 to 103, wherein the metal salt formulation comprises at least two different metal salts and/or at least two metal salts which differ in degree of compaction.

105. The use according to any one of embodiments 96 to 104 wherein the metal salt formulation is dissolved or dispersed in the ionic liquid formulation.

106. The use according to any one of embodiments 96 to 105 for generating breathable oxygen or oxygen for technical purposes.

107. Use of an ionic liquid for releasing oxygen from a composition for generating oxygen promptly upon demand and/or over an extended period of time, the composition for generating oxygen having the features as defined in any one of embodiments 1 to 29.

108. The use according to embodiment 107 for generating breathable oxygen or oxygen for technical purposes.

109. A self-rescuer, rebreather, welding device or control nozzle comprising a device according to any one of embodiments 46 to 81.

A composition, method, device or use for generating oxygen in the sense of this invention is a composition, method, device or use intended for generating oxygen, while any composition, method, device or use which may generate oxygen as a side reaction does not constitute a composition, method, device or use in the sense of this invention.

The oxygen generating compositions according to exemplary embodiments of the invention comprise at least the following constituents: at least one peroxide compound as an oxygen source, at least one metal salt as a catalyst triggering the oxygen release reaction, and at least one ionic liquid as a carrier for providing contact between the oxygen source and the catalyst, and for dissipating the heat generated during the peroxide decomposition reaction. In exemplary embodiments the metal salt is soluble in the ionic liquid. The term "soluble" means that essentially the complete amount of the metal salt of a particular oxygen generating composition can be dissolved in the amount of ionic liquid used in this particular composition. The ratio of oxygen source:ionic liquid:metal salt can be varied, however, due to space constraints and also for economical reasons it is advantageous to keep the amount of ionic liquid reasonably small. Therefore, for the purpose of this invention, "soluble" means a solubility of at least 10 nmol (nanomol) metal salt in 1 g ionic liquid. In further exemplary embodiments, the metal salt is only partially soluble or insoluble in the ionic liquid. Typically, the metal salt catalysts have at least some solubility, i.e. are partially soluble.

The present inventors found that peroxide compounds such as hydrogen peroxide adduct compounds, can be decomposed in ionic liquids by contacting them with metal salts in a similar manner as metal salts in aqueous solution, but without the disadvantages of reactions catalyzed by metal salts in aqueous solutions. Exemplary composition of this invention do not contain any water. In particular, decomposition of peroxide compounds in ionic liquids yields breathable oxygen at low temperatures, and without requiring bulky thermal insulations for the oxygen generating device.

This can be attributed to the use of ionic liquids as a medium for providing contact between the oxygen source and the catalyst.

Ionic liquids are salts in the liquid state. Therefore, any salt that melts without decomposing or vaporizing yields an ionic liquid. Sometimes, salts which are liquid below the boiling point of water are considered as ionic liquids. Technically interesting are in particular those ionic liquids which are in the liquid state at relatively low temperatures such as at room temperature or even below room temperature.

An ionic compound is considered as an ionic liquid herein when it is in the liquid state at least in a temperature range from −10° C. to +50° C. Exemplary ionic liquids are in the liquid state at least from −30° C. to +70° C., and further exemplary ionic liquids are in the liquid state in an even broader temperature range such as from −70° C. to +150° C.

The properties of ionic liquids can be modified and adapted to the particular needs by varying the chemical structure. Typically, ionic liquids are thermally stable, have wide liquid regions, a high heat capacity and nearly no vapour pressure. Most of them are incombustible. They can be even used as flame retardants. Reference is made to US 2011/0073331 A1 disclosing ionic liquid flame retardants, and quoting literature disclosing preparation methods (paragraph 0127).

As indicated above, the ionic liquids used in the present invention should be in the liquid state at a low temperature, such as down to −10° C., or down to −30° C. or even below. Such ionic liquids are salts consisting of organic cations and organic or inorganic anions, and both cations and anions are bulky. In exemplary embodiments, they are bulky and asymmetric. As a general rule, the melting temperature decreases with increasing bulkiness and decreasing symmetry of cations and anions. Combinations of highly bulky and asymmetric cations and anions may not freeze down to temperatures as low as −120° C. Many ionic liquids are available which are liquid at −70° C. and above.

Suitable cations are, for example, imidazolium, pyrrolidinium, ammonium, pyridinium, pyrazolium, piperidinium, phosphonium, and sulfonium cations. The cations may or may not have substituents. Particularly, the cations may have one or more substituents, for example alkyl side chains such as methyl or butyl side chains. The substitution may be symmetric or asymmetric.

Suitable anions include, for example dimethylphosphate, methylsulfate, ethyl sulfate, trifluoromethylsulfonate, bis(trisfluoromethylsulfonyl)imide, chloride, bromide, iodide, tetrafluoroborate, hexafluorophosphate, acetate, and but-3-enoate. In the case of "small" anions such as chloride, bromide, and iodide, particularly bulky cations can be selected, in order to provide for the desired low temperature liquidity.

Some exemplary ionic liquids are:
1-butyl-3-methylimidazoliumdimethylphosphate (BMIMPO$_4$Me$_2$)
1,3-dimethylimidazoliumtdimethylphosphate (MMIMPO$_4$Me$_2$),
1-butyl-3-methylimidazoliumacetate (BMIMOAc),
1-ethyl-3-methylimidazoliumethylsulfate (EMIMEtSO$_4$), and
tetraethylammonium but-3-enoate (NEt$_4$but-3-enoat).

The ionic liquids usable herein are, however, not particularly limited. It is only required that they are liquid and stable (i.e. they do not decompose) in the desired temperature range. Of course, the ionic liquids should not react with any constituents of the oxygen generating composition. The ionic liquids may be used singly or in combinations of two or more. Thus, in exemplary embodiments, this invention uses ionic liquid formulations. Such formulations may contain further additives which do not detrimentally interfere with the peroxide decomposition reaction.

As an oxygen source, peroxide compounds, in particular solid hydrogen peroxide adduct compounds are used. Solid hydrogen peroxide adduct compounds constitute suitable and stable substituents for liquid hydrogen peroxide, are easily storable, long term stable and safe to work with. Exemplary oxygen sources are alkali percarbonates, e.g.

sodium percarbonate ($Na_2CO_3 \times 1.5H_2O_2$), alkali perborates, e.g. sodium perborate ($NaBO_3 \times 4H_2O$, $NaBO_3 \times H_2O$), and urea hydrogen peroxide (UHP). In UHP urea and hydrogen peroxide are present in a molar ratio of about 1:1.

The peroxide compounds are not particularly limited, as long as they are stable under usual storage conditions. Exemplary peroxide compounds are stable also at elevated temperatures, for example in the vicinity of a fire. The peroxide compounds can be soluble or partially soluble or insoluble in the ionic liquids. The peroxide compounds can be used singly or in combinations of two or more; i.e. as oxygen source formulations. Such formulations may contain further additives which do not detrimentally interfere with the peroxide decomposition reaction.

The decomposition reaction of the peroxide compound is catalyzed by metal salts. The metals salts comprise one single metal or two or more different metals and an organic and/or an inorganic anion.

In exemplary embodiments the metal salt is soluble in the ionic liquid, and in further exemplary embodiments, the metal salt is not soluble or partially soluble in the ionic liquid. Selecting a metal salt and an ionic liquid such, that the desired amount of metal salt is completely dissolved in the desired amount of ionic liquid provides the advantage that the metal salt and the ionic liquid can be provided in the form of one single homogeneous component. The solutions are stable, and even during long term storage, no sedimentation takes place. Providing the metal salt and the ionic liquid in the form of a homogeneous solution simplifies the design of oxygen generating devices, results in a higher activity of the mixture of catalyst and ionic liquid and, in turn, reduces the required amount of catalyst. A further advantage is the prolonged shelve life of the compositions, as compared to compositions containing the catalyst in suspended form.

The solubility behaviour of metal salts in ionic liquids is, at least roughly, analogous to the solubility behaviour in water. Therefore, if readily soluble catalysts are desired, metal salts known to be readily soluble in water can be used, and if hardly soluble catalysts are desired, metal salts known to be hardly soluble in water can be used.

As regards inorganic anions, anions such as chlorides, sulfates, carbonates, hydroxides, nitrates and phosphates are known to provide water solubility, and as regards organic anions, anions such as chelating agents, i.e. anions forming coordination complexes with metals, are known to provide water solubility.

Accordingly, in exemplary embodiments, the metal salt is at least one selected from the group consisting of chlorides, sulfates, carbonates, hydroxides, nitrates and phosphates. Metal salts having these inorganic anions are generally well soluble in many ionic liquids.

In further exemplary embodiments, the metal salt is at least one selected from the group consisting of acetates, acetylacetonates, oxalates, tartrates, and citrates. Metal salts having these chelating organic anions are generally well soluble in many ionic liquids.

In further exemplary embodiments, a fraction of the organic or inorganic anions is substituted by oxygen anions, thus yielding mixed catalysts, i.e. metal compounds comprising both oxidic anions and inorganic anions or organic anions, or even metal compounds comprising oxidic anions, inorganic anions, and organic anions.

The metal salt, in exemplary embodiments, contains one single metal, optionally in different oxidation states, the metal being selected from the metals belonging to groups 5 to 14 and periods 4 to 6 of the periodic table of the elements. The periodic table has 18 groups and 7 periods (see: Pure and Applied Chemistry, 1988, Vol. 60, No. 3, pages 431-436).

In further exemplary embodiments, the metal salt comprises at least two different metals, with at least one metal being selected from the metals belonging to groups 5 to 14 and periods 4 to 6 of the periodic table of the elements.

The metal salts may be used singly or in combinations of two or more different metal salts. The salts may have different cations or different anions or both different cations and different anions.

The metal salt comprises at least one metal in an oxidation state allowing a reaction with hydrogen peroxide, assuming basic conditions in aqueous reaction media, i.e. the redox potential of the oxidation state transition which the metal undergoes during the catalytic reaction must allow a reaction with hydrogen peroxide.

Exemplary metal salt catalysts include salts of vanadium, chromium, manganese, iron, cobalt, copper, molybdenum, ruthenium, iridium, and lead. Exemplary oxidation states are +2 for vanadium, +3 and +6 for chromium, +2 and +3 for manganese, +2 and +3 for iron, +2 for cobalt, +1 and +2 for copper, +6 for molybdenum, +3 for ruthenium, +3 for iridium, and +2 and +4 for lead.

As exemplary inorganic salts catalysing the peroxide decomposition reaction may be mentioned: $PbCl_2$, $CrCl_3$, $CoCl_2$, $CoCO_3$, $CoSO_4$, $IrCl_3$, $MnCl_2$, $VCl_2$, $KCr(SO_4)_2$, $FeCl_3$, $CuCl_2$, and their respective hydrates.

As exemplary organic salts catalysing the peroxide decomposition reaction may be mentioned: $Mn(OAc)_2$, $Mn(OAc)_3$, $Mn(acac)_2$, $Mn(oxalate)$, $Pb(acac)_2$, $Pb(OAc)_2$, $Pb_3(citrate)_2$, $Pb(tartrate)$, $Co(OAc)_2$, $MoO_2(acac)_2$, $Ru(acac)_3$, and their respective hydrates. OAc means acetate and acac means acetylacetonate.

The above listed inorganic and organic salts constitute active catalysts in many ionic liquids.

The compositions for generating oxygen may comprise from about 10 to 80 weight % of one or more oxygen sources, from about 20 to 80 weight % of one or more ionic liquids, and from more than 0 up to about 15 weight % of one or more metal salt catalysts. In exemplary embodiments, the oxygen source or mixture of oxygen sources constitutes from 50 to 70 weight %, the ionic liquid or mixture of ionic liquids constitutes from 30 to 60 weight %, and the metal salt catalyst or mixture of metal salt catalysts constitutes from more than 0 up to about 10 weight % of the composition. In some embodiments, the oxygen source may constitute up to 98 weight % of the composition, with the amounts of ionic liquid and catalyst being present in amounts as low as about 1% by weight, each. Optionally, further constituents may be present, for example silicon dioxide (as a heat sink), resorcinol (as a radical scavenger), 2-methylhydrochinone, eugenol, phenol, and 4-propylphenol, all of which reduce the peroxide decomposition rate. In some embodiments, the amounts of such additional constituents do not exceed about 20 weight % of the composition. All constituents together add up to 100 weight %.

In the context herein, the term "composition" includes embodiments wherein all constituents of the composition are mixed, i.e. are in contact with each other, as well as embodiments wherein the constituents are not in contact with each other, or wherein at least not all constituents are in contact with each other. It must be considered that a mixture comprising an ionic liquid, a peroxide compound dissolved or dispersed therein, and a metal salt catalyst, is not stable. Rather, the decomposition of the peroxide compound starts as soon as the metal salt catalyst comes into contact with the peroxide compound, in the ionic liquid, or at least shortly thereafter. Therefore, the constituents of the composition for generating oxygen must be stored in a condition wherein the catalyst cannot trigger the release of oxygen from the peroxide compound. This can be achieved by providing the composition for generating oxygen in the form of a "kit of parts", i.e. as a combination of at least two components, the two components comprising the at least one oxygen source, the at least one ionic liquid, and the at least one metal salt compound. In the at least two components, at least one of the three constituents (the oxygen source(s), the ionic liquid(s), and the metal salt(s)) is not in contact with the other constituents of the composition for generating oxygen.

According to a first embodiment, the composition comprises a first component and a second component, the first component comprising the oxygen source and the ionic liquid, and the second component comprising the metal salt.

According to a second embodiment, the composition comprises a first component and a second component, the first component comprising the metal salt and the ionic liquid, and the second component comprising the oxygen source. In case of a soluble metal salt, the first component is a homogenous solution, and in the case of an insoluble metal salt, or partially soluble metal salt, the first component is a dispersion or suspension, respectively.

According to a third embodiment, the composition comprises a first component and a second component, the first component comprising the oxygen source and the metal salt, and the second component comprising the ionic liquid.

According to a fourth embodiment, the composition comprises three components, the first component comprising the oxygen source, the second component comprising the ionic liquid, and the third component comprising the metal salt.

Accordingly, an exemplary method for generating oxygen comprises providing at least one oxygen source, providing at least one ionic liquid, providing at least one metal salt, wherein the oxygen source is a peroxide compound, the ionic liquid is in the liquid state at least in the temperature range from −10° C. to +50° C., the metal salt comprises one single metal or two or more different metals, and an organic and/or inorganic anion, and contacting the at least one oxygen source, the at least one ionic liquid, and the at least one metal salt.

According to a first embodiment, the oxygen source and the ionic liquid are provided as a first component, the metal salt is provided as a second component, and the step of contacting comprises mixing the first component and the second component.

According to a second embodiment, the metal salt and the ionic liquid are provided as a first component, the oxygen source is provided as a second component, and the step of contacting comprises mixing the first component and the second component.

According to a third embodiment, the oxygen source and the metal salt are provided as a first component, and the ionic liquid is provided as a second component, and the step of contacting comprises mixing the first component and the second component.

According to a fourth embodiment, the oxygen source is provided as a first component, the ionic liquid is provided as a second component, the metal salt is provided as a third component, and the step of contacting comprises mixing the first component, the second component and the third component.

When the oxygen source and the metal salt are provided as one single component, i.e. in an admixed state, both the oxygen source and the metal salt should be thoroughly dried before mixing. Otherwise, the oxygen source will be decomposed inadvertently. In the absence of any mediator, for example water or an ionic liquid, the solid oxygen source and the solid metal salt constitute long term stable mixtures.

An exemplary device for generating oxygen by the above method is specifically adapted for housing the components of the composition for generating oxygen in a physically separated state, and bringing them into physical contact once generation of oxygen is desired.

An exemplary device comprises at least one reaction chamber. The reaction chamber may have one single compartment or two compartments separated from one another by a membrane or another means which can be easily destroyed, for example a thin glass plate or a thin metal or plastic foil. Alternatively, the reaction chamber may contain at least one receptacle for receiving one or two of the constituents of the composition for generating oxygen, i.e. one or two of the at least one oxygen source, the at least one ionic liquid, and the at least one metal salt. By placing at least one of the constituents in a sealable receptacle, while the other constituents are outside the receptacle, or alternatively, by placing at least one of the constituents of the composition for generating oxygen in a first compartment of the reaction chamber, while the other constituents are placed in a second compartment of the reaction chamber, the constituents are maintained physically separated, and a decomposition reaction of the peroxide compound is prevented.

In order to allow the generation of oxygen, physical contact of the constituents of the composition for generating oxygen must be established. This can be achieved, for example, by destroying the membrane or foil or other means separating the first compartment and the second compartment of the reaction chamber, or by destroying the receptacle containing at least one of the constituents of the composition for generating oxygen. The membrane or other separating means may be, for example, destroyed by a cutting edge of a cutting device arranged in one of the compartments of the reaction chamber, and the receptacle arranged within a reaction chamber containing only one compartment may be, for example, destroyed by a solid plate, a grid, or a firing pin. Both the cutting device having the cutting edge and the solid plate or grid are moved upon activation by an actuator, for example a spring mechanism. The actuator may be actuated, for example, by a person requiring oxygen or may be actuated automatically, once a low oxygen condition is sensed by an oxygen sensor.

Once contact of the constituents has been established, oxygen generation begins promptly or somewhat delayed, depending on the state of the constituents as will be described below. The oxygen leaves the reaction chamber via means allowing the passage of oxygen, while otherwise sealing the reaction chamber, for example a gas permeable membrane, or any other structure which is gas permeable, but liquid tight, e.g. a frit or a molecular sieve. When the reaction chamber is arranged within a container, the oxygen may be released into a head space of the container, and leave the container through an oxygen outlet.

In an exemplary embodiment, the device for generating oxygen comprises more than one reaction chamber, and the at least two reaction chambers are arranged within a common container. Each reaction chamber may be provided, individually, with means for establishing physical contact of the constituents of the composition for generating oxygen, or alternatively, a common such means may be provided for a plurality of the reaction chambers or for all reaction chambers. The oxygen generated in each reaction chamber is released into a common head space of the container, and leaves the container through an oxygen outlet.

The embodiment comprising a plurality of reaction chambers allows that oxygen can be provided over a particularly long time period by charging the reaction chambers with compositions for generating oxygen having different oxygen release profiles. Alternatively, such compositions having different oxygen release profiles may be also charged into one single reaction chamber, thus providing oxygen over a long time period. It is readily apparent that such device for generating oxygen having only one reaction chamber is of a very simple construction. Simple constructions are typically the most reliable ones.

It has been found by the present inventors, that the course of the decomposition reaction of the peroxide compound can be influenced by various factors.

One such factor is the nature of the peroxide compound, another factor is the nature of the ionic liquid, and a further factor is the nature of the metal salt.

All these factors have been found to influence the time of onset of the decomposition reaction, the reaction speed, and the amount of oxygen released. The differences are believed to be due to solubility differences in the ionic liquids, and to different viscosities of the ionic liquids.

In addition, the amount of metal salt catalyst has an influence on the peroxide decomposition reaction. The reaction profile of the decomposition reaction depends on the concentration of the metal salt catalyst, and on its solubility characteristics in the ionic liquid, i.e. the reaction rate, the time point of onset of the reaction, and the reaction temperature is different for different metal salt catalyst concentrations. The decomposition reaction rate increases with increasing amount of catalyst.

What has a great influence on the decomposition reaction profile, is the surface area of the peroxide compound exposed to the metal salt catalyst. The reaction rate can be varied by reducing or enlarging the surface area of the peroxide compound. The reaction is particularly fast, when the peroxide compounds are present in the form of fine particles. Small particles can be easily and quickly dissolved in the ionic liquid, and even in the case of low solubility in the ionic liquid, small particles have a relatively larger surface area than an equal weight of coarser particles.

If it is desired to extend the time span of oxygen generation, or if it is desired to delay the onset of the decomposition reaction, the peroxide compound may be compressed into powder compacts. Powder compacts may differ in shape (having, for example, cylindrical or rectangular block shapes), in dimensions, in degree of compaction (which increases with increasing compaction pressure), and in weight. It has been found that the weight directly influences the amount of oxygen generated, i.e. the reaction is scalable. The reaction rate, however, is independent of the weight and the shape of the powder compacts and also quite independent of the dimensions of the powder compacts.

An influence has been found also for the degree of compaction. High compaction pressures delayed the onset of the reaction and/or extended the time period of oxygen generation. The reason is that high compaction pressure results in high density of the powder compacts, resulting in low porosity of the powder compacts. Powder compacts having many open pores at the surfaces thereof can be easily and quickly penetrated by the ionic liquid, while powder compacts having only few open pores at the surfaces thereof do not allow fast penetration of the ionic liquid into the bulk of the powder compact. Therefore, contact with the metal salt catalyst is delayed in the case of powder compacts having a high degree of compaction, and the delay increases with increasing degree of compaction.

In exemplary embodiments, the ionic liquids described above are used as dispersants or solvents and as heat sinks in the compositions for generating oxygen described above.

The disclosed uses, methods and devices may take advantage of any of the materials described above in relation to compositions and vice versa.

All references herein to "comprising" should be understood to encompass "including" and "containing" as well as "consisting of" and "consisting essentially of".

The term "a" means "at least one".

BRIEF DESCRIPTION OF THE DRAWINGS

The invention will be further illustrated by the following non-limiting examples with reference to the accompanying drawings, wherein.

DETAILED DESCRIPTION

In all graphs illustrating oxygen release or reaction temperature, oxygen release (or reaction temperature, respectively) is plotted against runtime, wherein runtime is the time which starts running at the time point of contacting the oxygen source, the ionic liquid and the catalyst. In the tables, "volume" is the oxygen volume released in total, and "time" is the time until complete release of the releasable oxygen.

Example 1

Urea hydrogen peroxide (UHP) adducts in the amounts listed in table 1 were added to solutions of 0.5 mol % (relative to UHP) $MnCl_2$ in BMIMOAc (amounts listed in table 1) contained in a glass flask. The flask was closed, and the oxygen volume released by the decomposition reaction was measured with a drum gas meter. In addition, the reaction temperature was measured. The results are illustrated in FIGS. 1 and 2.

TABLE 1

| peroxide | mass | | | |
|---|---|---|---|---|
| 2 | 1 g | 13.4 mg | 155 ml | 1.30 min |
| 5 | 2.5 g | 33.5 mg | 345 ml | 5.78 min |
| 10 | 5 g | 67.0 mg | 1205 ml | 11.94 min |
| 20 | 10 g | 134.0 mg | 2810 ml | 9.84 min |

Figure 1:
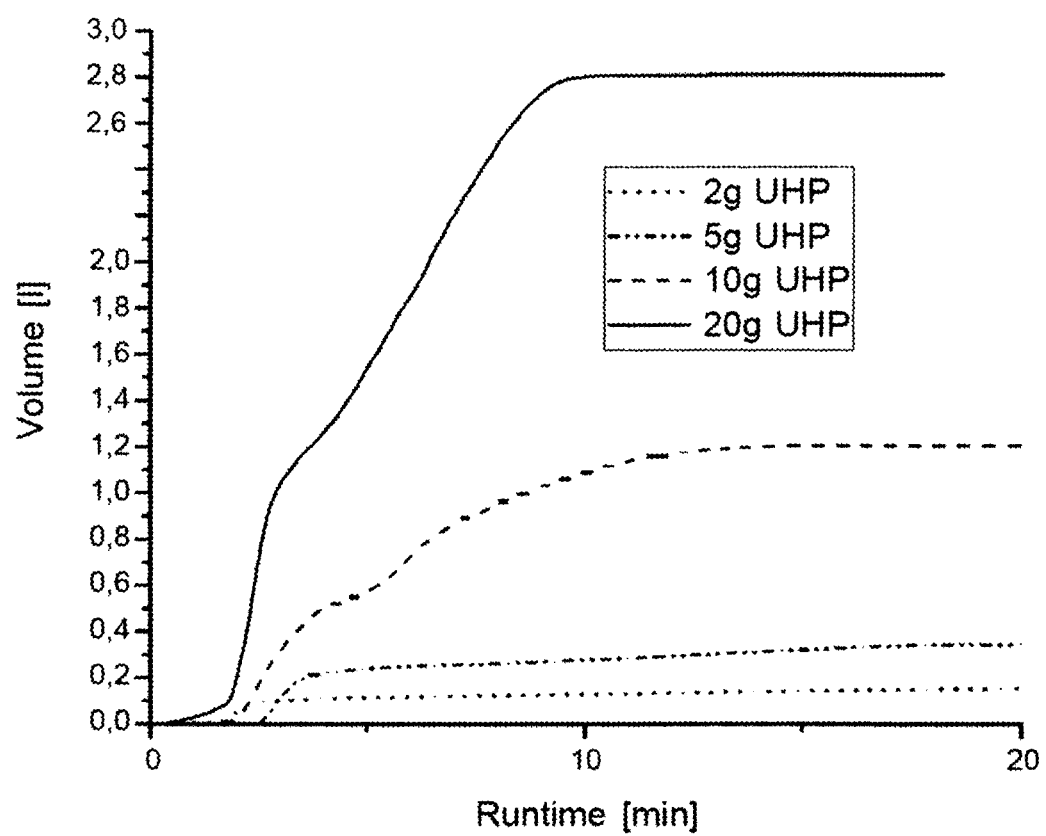
FIG. 1 is a graph illustrating oxygen release from different amounts of UHP by $MnCl_2$ in BMIMOAc.
Figure 2:
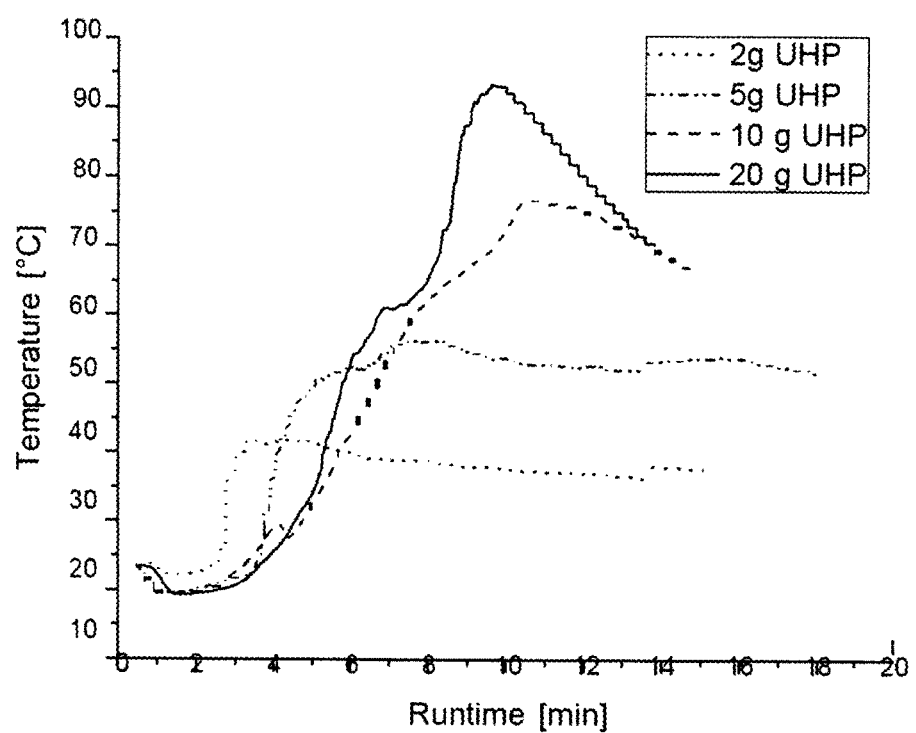
FIG. 2 is a graph illustrating reaction temperatures for the decomposition reactions illustrated in FIG. 1.

FIG. 1 shows that when varying amounts of peroxide compound are added to equivalently varying amounts of an ionic liquid and a soluble metal salt having an inorganic anion as a catalyst, the amount of oxygen released by the decomposition reaction increases essentially proportionally, thus proving that the decomposition reaction is scalable for different sizes of devices for generating oxygen.

FIG. 2 shows that the reaction temperatures increase with increasing amounts of reaction mixture, but remain below 100° C. even for the sample containing 20 g UHP.

Example 2

Urea hydrogen peroxide (UHP) adduct in the amounts listed in table 2 was added to solutions of 1.25 mol % (relative to UHP) $Mn(OAc)_3$ in BMIMOAc (amounts listed in table 2) contained in a glass flask. The flask was closed, and the oxygen volume released by the decomposition reaction was measured with a drum gas meter. In addition, the reaction temperature was measured. The results are illustrated in FIGS. 3 and 4.

TABLE 2

| peroxide | mass | mass IL | mass catalyst | volume | tim |
|---|---|---|---|---|---|
| UHP | 6 g | 3 g | 213.8 mg | 405 ml | 7.87 min |
| UHP | 10 g | 5 g | 365.3 mg | 910 ml | 10.16 min |
| UHP | 14 g | 7 g | 498.8 mg | 1520 ml | 12.80 min |
| UHP | 20 g | 10 g | 712.5 mg | 2685 ml | 15.42 min |

Figure 3:
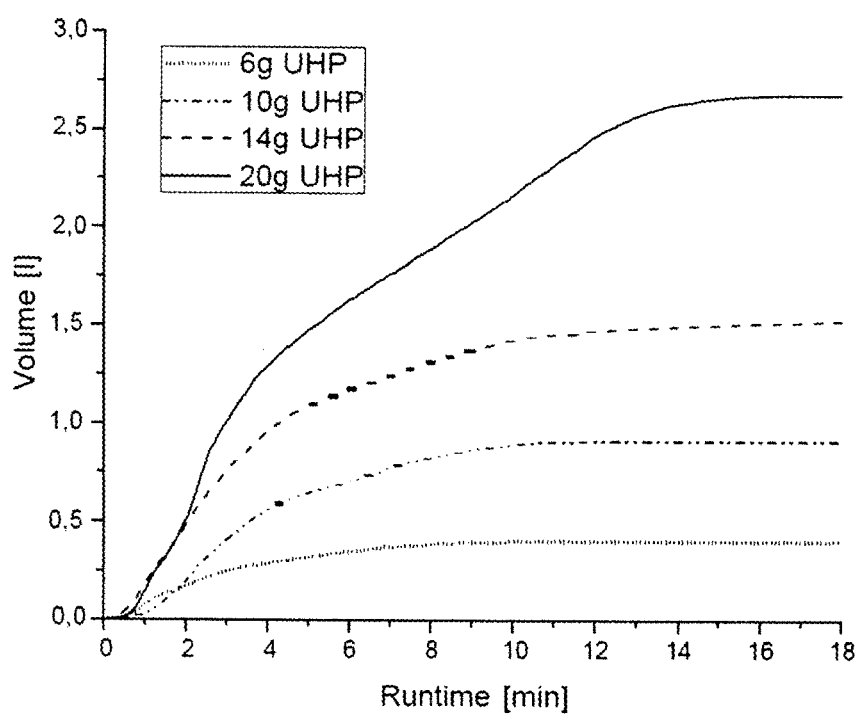
FIG. 3 is a graph illustrating oxygen release from different amounts of UHP by $Mn(OAc)_3$ in BMIMOAc.
Figure 4:
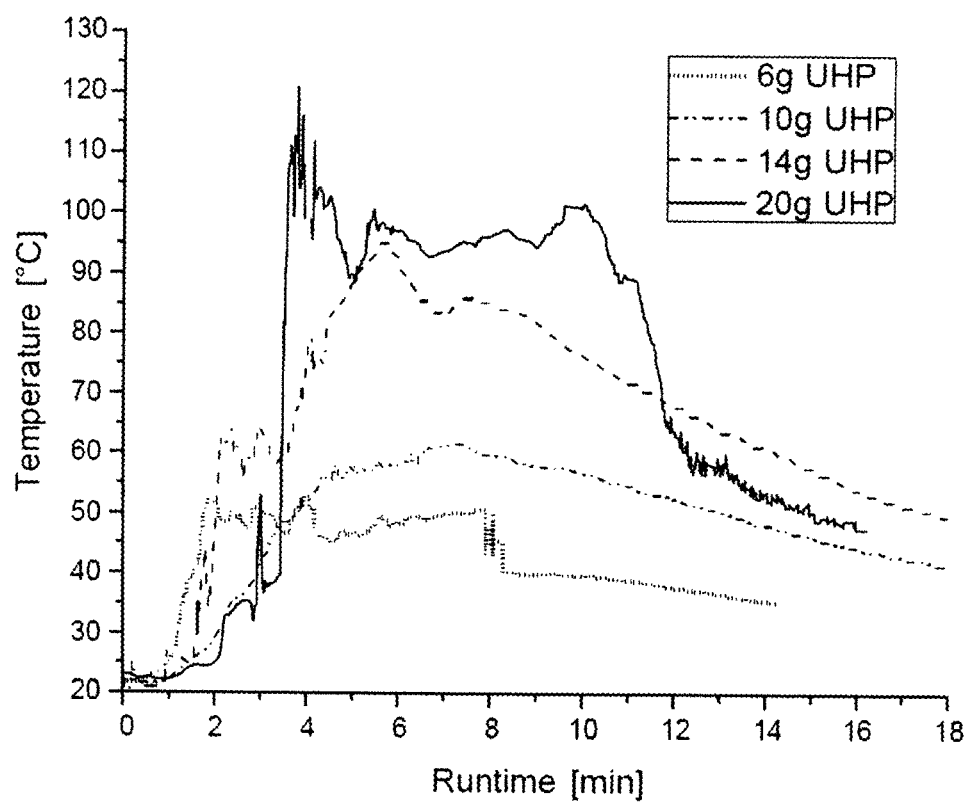
FIG. 4 is a graph illustrating reaction temperatures for the decomposition reactions illustrated in FIG. 3.

FIG. 3 shows that when varying amounts of a peroxide compound are added to equivalently varying amounts of an ionic liquid and a soluble metal salt having an organic anion as a catalyst, the amount of oxygen released by the decomposition reaction increases proportionally, thus proving that the decomposition reaction is scalable for different sizes of devices for generating oxygen.

FIG. 4 shows that the reaction temperatures increase with increasing amounts of reaction mixture, but remain below 120° C. even for the sample containing 20 g UHP.

Example 3

Figure 5:
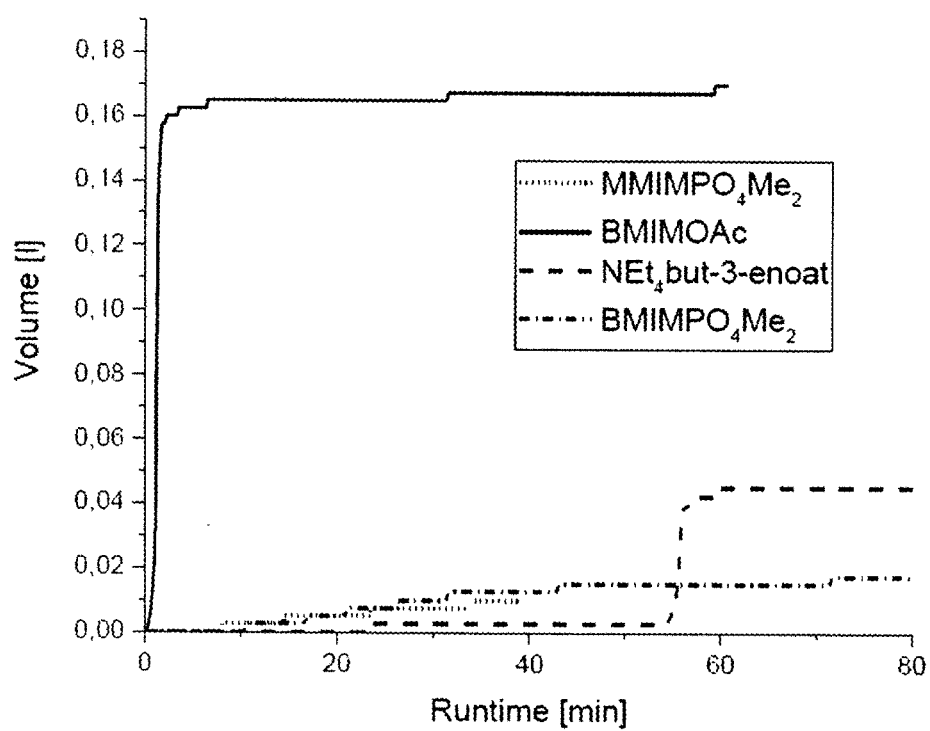
FIG. 5 is a graph illustrating oxygen release from UHP in different ionic liquids by catalytic amounts of $IrCl_3$.

2.0 g urea hydrogen peroxide adduct compound (UHP) were added to a solution of 2 mol % (relative to UHP) IrCl3 catalyst in 1.0 g of different ionic liquids (IL) contained in a glass flask each. The ionic liquids used are listed below. The flask was closed, and the oxygen volume released by the decomposition reaction was measured with a drum gas meter. The results are listed in table 3, and are illustrated in FIG. 5.

Ionic Liquids:
1-butyl-3-methylimidazoliumdimethylphosphate ($BMIMPO_4Me_2$)
1,3-dimethylimidazoliumdimethylphosphate ($MMIMPO_4Me_2$)
1-butyl-3-methylimidazoliumacetate (BMIMOAc)
tetraethylammonium but-3-enoate ($NEt_4$but-3-enoate)

TABLE 3

| peroxide adduct | IL | mass catalyst | volume | time |
|---|---|---|---|---|
| UHP | $BMIMPO_4Me_2$ | 127 mg | 20 ml | 80 min |
| UHP | $MMIMPO_4Me_2$ | 127 mg | 10 ml | 40 min |
| UHP | BMIMOAc | 127 mg | 170 ml | 1.21 min |
| UHP | $NEt_4$but-3-enoate | 127 mg | 45 ml | 60 min |

In the cases of $BMIMPO_4Me_2$, $MMIMPO_4Me_2$, and $NEt_4$but-3-enoate the reaction was terminated after 80 minutes, 40 minutes, and 60 minutes, respectively, although not complete.

FIG. 5 reveals that the ionic liquid used as a solvent has a pronounced influence on the reaction speed of the decomposition reaction, on the amount of oxygen released, and also on the time of onset of the decomposition reaction.

Example 4

Figure 6:
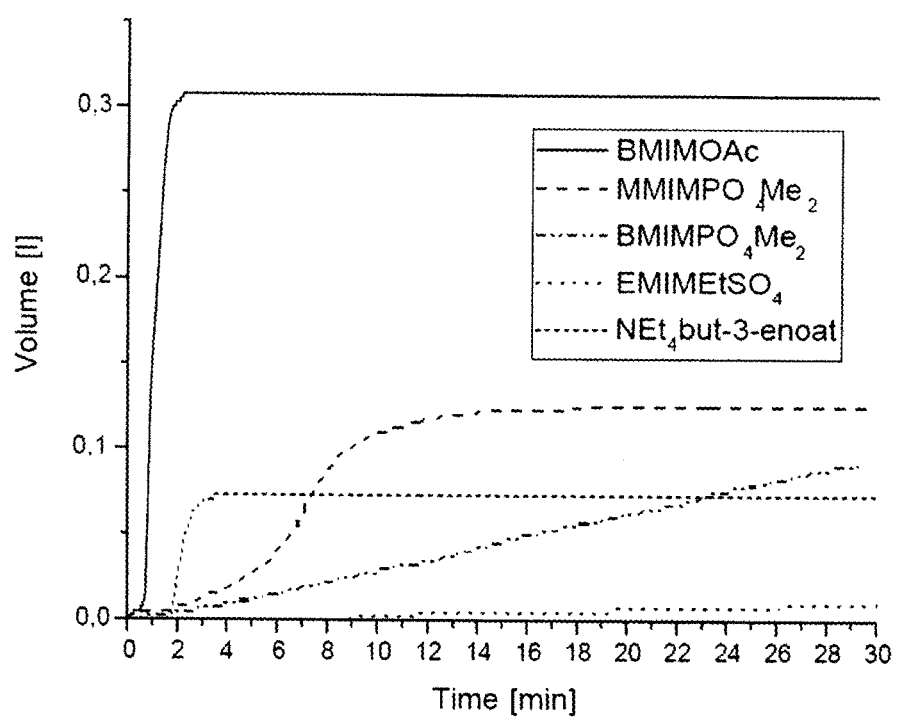
FIG. 6 is a graph illustrating oxygen release from UHP in different ionic liquids by catalytic amounts of $Co(OAc)2$.

2.0 g urea hydrogen peroxide adduct compound (UHP) were added to a solution of 0.25 mol % (relative to UHP) $Co(OAc)_2$ catalyst in 1.0 g of different ionic liquids (IL) contained in a glass flask each. The ionic liquids used are listed below. The flask was closed, and the oxygen volume released by the decomposition reaction was measured with a drum gas meter. The results are listed in table 4, and are shown in FIG. 6

Ionic Liquids:
1-butyl-3-methylimidazoliumdimethylphosphate ($BMIMPO_4Me_2$)
1,3-dimethylimidazoliumdimethylphosphate ($MMIMPO_4Me_2$)
1-butyl-3-methylimidazoliumacetate (BMIMOAc)
1-ethyl-3-methylimidazoliumethylsulfate ($EMIMEtSO_4$)
tetraethylammonium but-3-enoate ($NEt_4$but-3-enoate)

TABLE 4

| peroxide adduct | IL | mass catalyst | volume | tim |
|---|---|---|---|---|
| UHP | $BMIMPO_4Me_2$ | 13.3 mg | 90 ml | 30.0 min |
| UHP | $MMIMPO_4Me_2$ | 13.3 mg | 125 ml | 3.15 min |
| UHP | BMIMOAc | 13.3 mg | 310 ml | 1.90 min |
| UHP | $EMIMEtSO_4$ | 13.3 mg | 10 ml | 30.0 min |
| UHP | $NEt_4$but-3-enoate | 13.3 mg | 75 ml | 1.34 min |

In the cases of $BMIMPO_4Me_2$ and $EMIMEtSO_4$ the reaction was terminated after 30 minutes, although not complete.

FIG. 6 reveals that the ionic liquid used as a solvent has a pronounced influence on the reaction speed of the decomposition reaction and on the amount of oxygen released by the decomposition reaction. The ionic liquid also exerts some influence on the time when the decomposition reaction starts.

Example 5

2.0 g UHP were added to solutions of different inorganic metal salts in 1.0 g BMIMOAc contained in a glass flask. The flask was closed, and the oxygen volume released by the decomposition reaction was measured with a drum gas meter. The types and amounts of catalysts used are listed in table 5, and some of the reaction profiles of the decomposition reaction are shown in FIGS. 7 and 8.

TABLE 5

| peroxide | catalyst | mass catalyst | volume |
|---|---|---|---|
| UHP | $PbCl_2$ | 118.3 mg | 295 ml |
| UHP | $CrCl_3$ | 113.3 mg | 650 ml |
| UHP | $K_2Cr_2O_7$ | 183.7 mg | 565 ml |
| UHP | $CoCl_2$ | 101.2 mg | 295 ml |
| UHP | $CoCO_3$ | 50.6 mg | 320 ml |
| UHP | $CoSO_4$ | 119.5 mg | 285 ml |
| UHP | $IrCl_3$ | 127.0 mg | 165 ml |
| UHP | $MnCl_2$ | 53.5 mg | 310 ml |
| UHP | $VCl_2$ | 103.6 mg | 440 ml |
| UHP | $KCr(SO_4)_2$ | 212.3 mg | 590 ml |
| UHP | $FeCl_2$ | 123.6 mg | 390 ml |
| UHP | $FeCl_3$ | 114.9 mg | 380 ml |
| UHP | $Fe(NO_3)_3$ | 42.9 mg | 275 ml |
| UHP | $CuCl_2$ | 57.2 mg | 460 ml |

Figure 7:
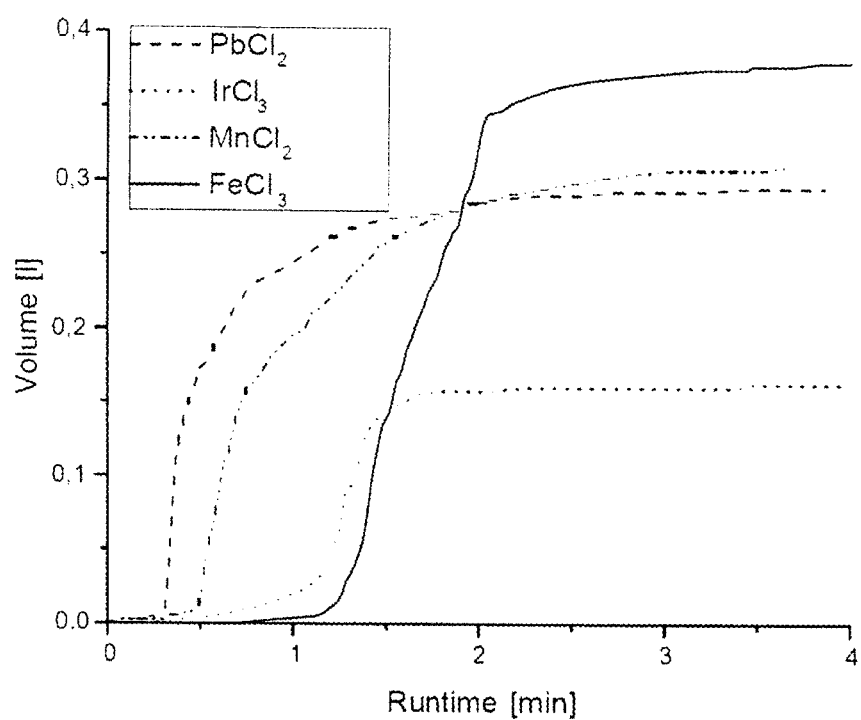
FIGS. 7 and 8 are graphs illustrating oxygen release from UHP in BMIMOAc by different inorganic metal salts.
Figure 8:
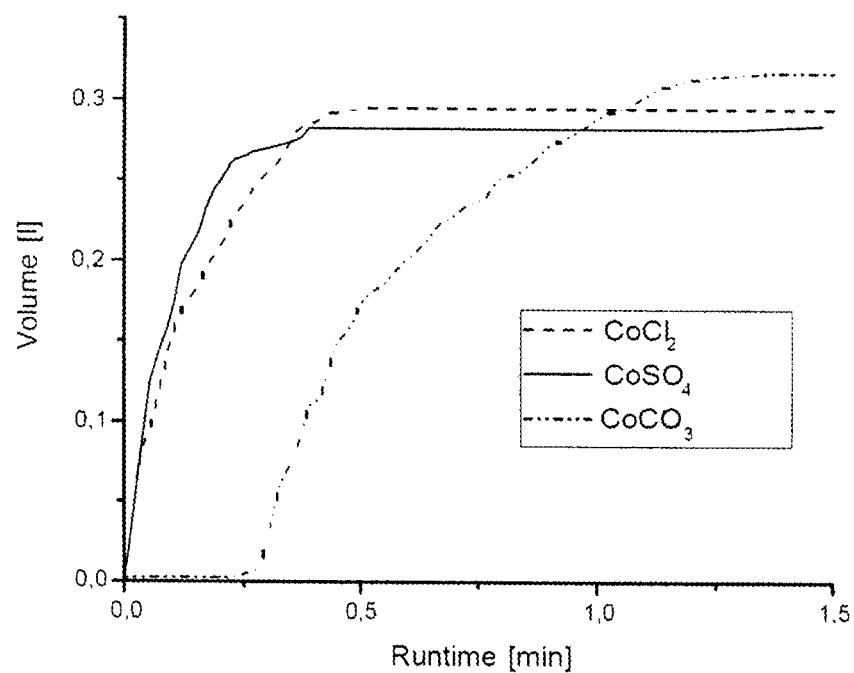

FIGS. 7 and 8 reveal that the catalyst has an influence on the amount of oxygen released, on the reaction speed, and also on the time of onset of the decomposition reaction.

Example 6

2.0 g UHP were added to solutions of different organic metal salts in 1.0 g BMIMOAc contained in a glass flask. This flask was closed, and the oxygen volume released by the decomposition reaction was measured with a drum gas meter. The types and amounts of catalysts used are listed in table 6, and some of the reaction profiles are shown in FIGS. 9 and 10.

TABLE 6

| peroxide | catalyst | mass catalyst | volume |
|---|---|---|---|
| UHP | $Mn(OAc)_2$ | 104.2 mg | 320 ml |
| UHP | $Mn(OAc)_3$ | 114.0 mg | 250 ml |
| UHP | $Mn(acac)_2$ | 107.6 mg | 300 ml |
| UHP | Mn(oxalate) | 76.1 mg | 75 ml |
| UHP | $Pb(acac)_2$ | 172.4 mg | 210 ml |
| UHP | $Pb(OAc)_2$ | 161.3 mg | 305 ml |
| UHP | $Pb(OAc)_4$ | 188.5 mg | 15 ml |
| UHP | $Pb_3(citrate)_2$ | 149.4 mg | 20 ml |
| UHP | Pb(tartrate) | 151.1 mg | 15 ml |
| UHP | $Co(OAc)_2$ | 13.3 mg | 310 ml |
| UHP | $MoO_2(acac)_2$ | 138.7 mg | 395 ml |
| UHP | $Ru(acac)_3$ | 63.5 mg | 135 ml |

Figure 9:
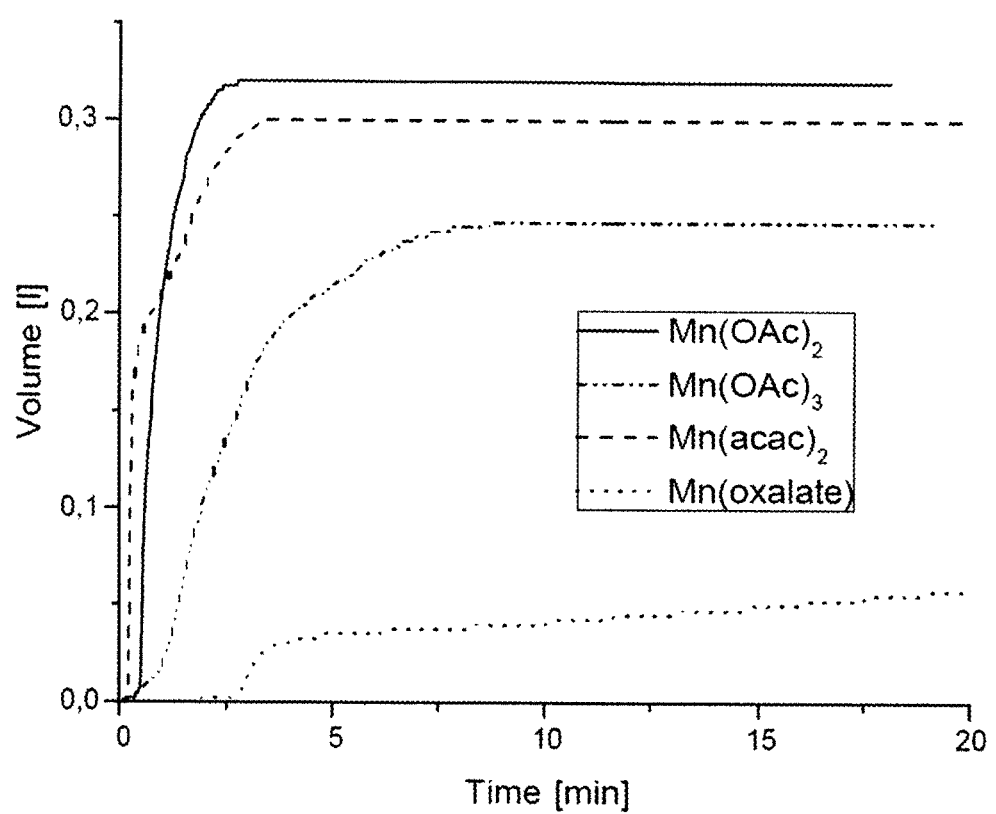
FIGS. 9 and 10 are graphs illustrating oxygen release from UHP in BMIMIOAc by different organic metal salts.
Figure 10:
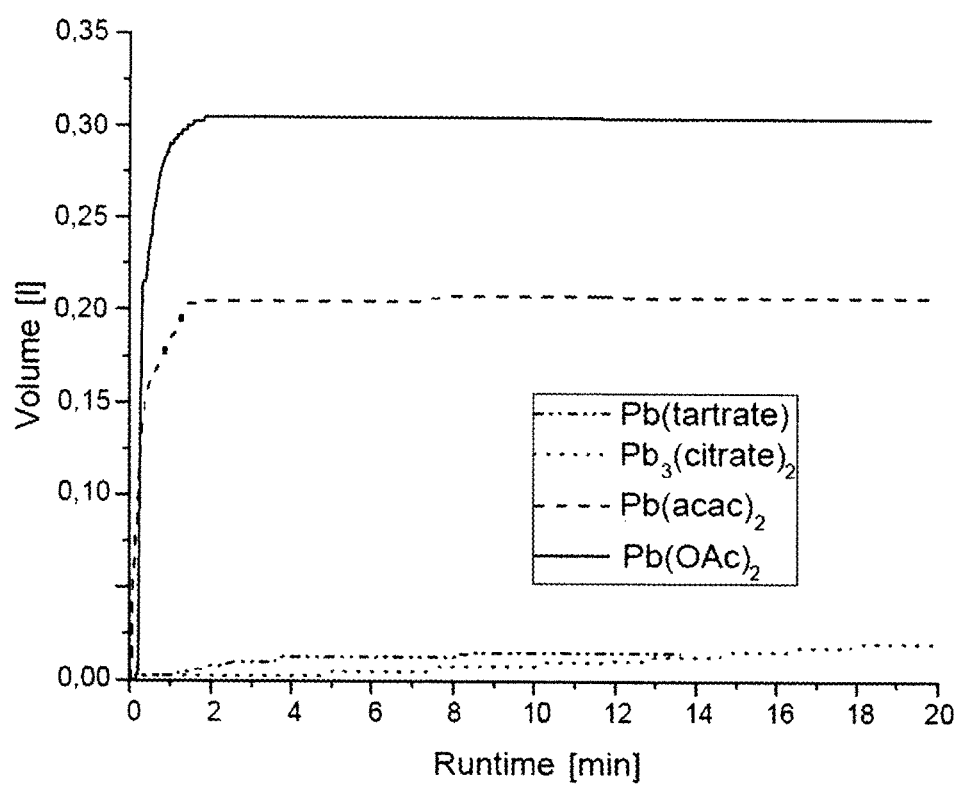

FIGS. 9 and 10 reveal that the amount of oxygen released by decomposition reaction strongly depends on the particular catalyst used. The catalyst also influences the reaction speed of the decomposition reaction.

Example 7

Figure 11:
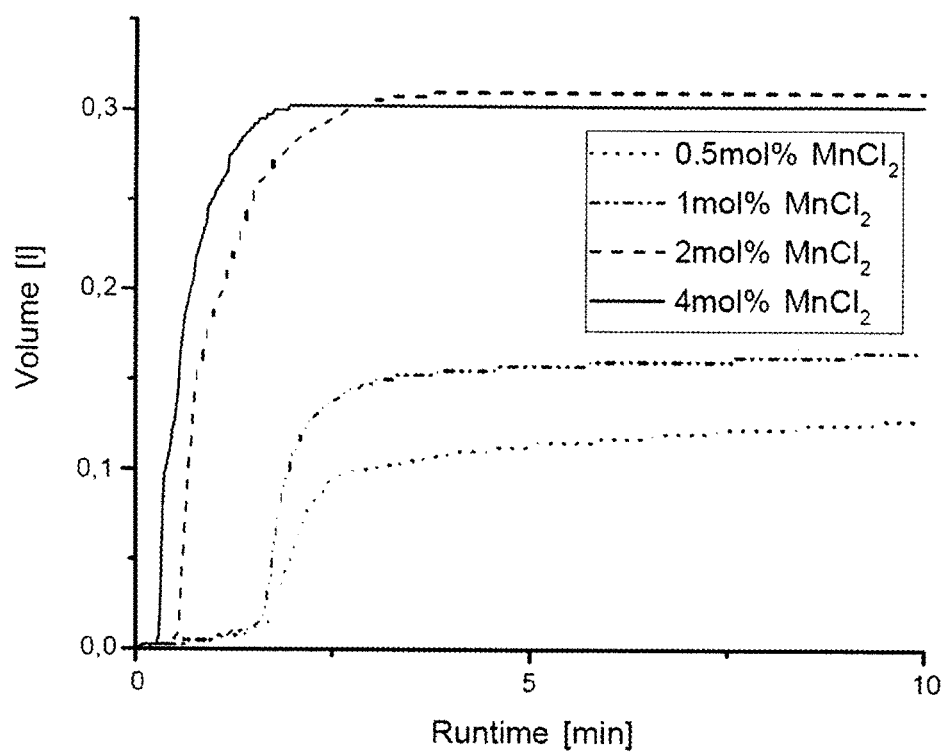
FIG. 11 is a graph illustrating oxygen release from UHP in BMIMOAc by different concentrations of $MnCl_2$.

2.0 g UHP were added to solutions of different amounts of $MnCl_2$ catalysts in 1.0 g BMIMOAc contained in a glass flask. The amounts and concentrations (relative to UHP) of $MnCl_2$ are indicated in table 7. The flask was closed, and the oxygen volume released by the decomposition reaction was measured with a drum gas meter. The reaction profiles are shown in FIG. 11.

TABLE 7

| peroxide adduct | mass/concentration | volume | time |
|---|---|---|---|
| UHP | 13.4 mg | 130 ml | 10 min |
| UHP | 26.8 mg | 165 ml | 10 min |
| UHP | 53.5 mg | 310 ml | 2.62 min |
| UHP | 107 mg | 305 ml | 1.66 min |

In the cases of 0.5 mol % and 1 ml % catalyst the reaction was terminated after 10 minutes.

FIG. 11 reveals that the catalyst concentration exerts a strong influence on the reaction velocity, the onset of the decomposition reaction, and on the amount of oxygen released. On the other hand, there is a catalyst "saturation" concentration, i.e. the amount of oxygen which can be produced is limited by the amount of oxygen available. Even very high amounts of catalyst can not achieve more than decompose the peroxide completely.

Example 8

5.0 g UHP were added to solutions of different amounts of $Mn(OAc)_2$ catalysts in 2.5 g BMIMOAc contained in a glass flask. The amounts and concentrations (relative to UHP) of $Mn(OAc)_2$ are indicated in table 8. The flask was closed, and the oxygen volume released by the decomposition reactions was measured with a drum gas meter. The reaction profiles are shown in FIG. 12.

TABLE 8

| peroxide adduct | mass/concentration catalyst | volume | time |
|---|---|---|---|
| UHP | 92.0 mg | 345 ml | 6.96 min |
| UHP | 114.9 mg | 635 ml | 5.22 min |
| UHP | 138.0 mg | 725 ml | 4.43 min |
| UHP | 183.9 mg | 740 ml | 3.27 min |

Figure 12:
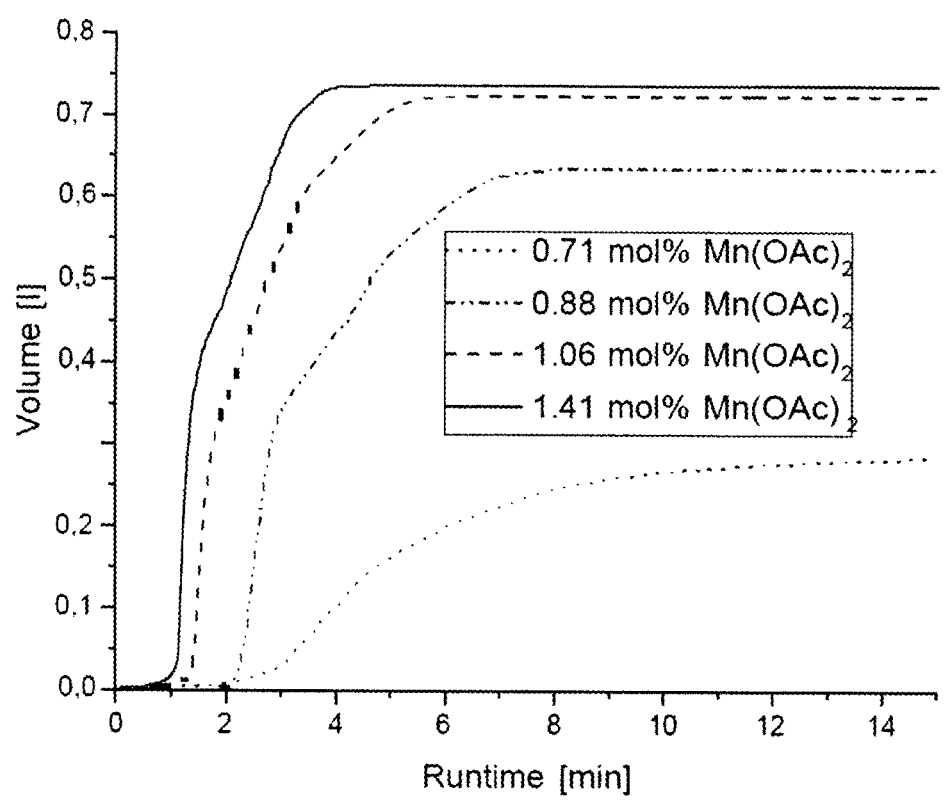
FIG. 12 is a graph illustrating oxygen release from UHP in BMIMOAc by different concentrations of $Mn(OAc)_2$.

FIG. 12 reveals that the catalyst concentration influences the reaction speed of the decomposition reaction, and exerts a strong influence on the amount of oxygen released. However, there is a "saturation" concentration. The amount of oxygen released is, of course, limited by the amount of oxygen provided by the amount of peroxide adduct compound.

Example 9

Figure 13:
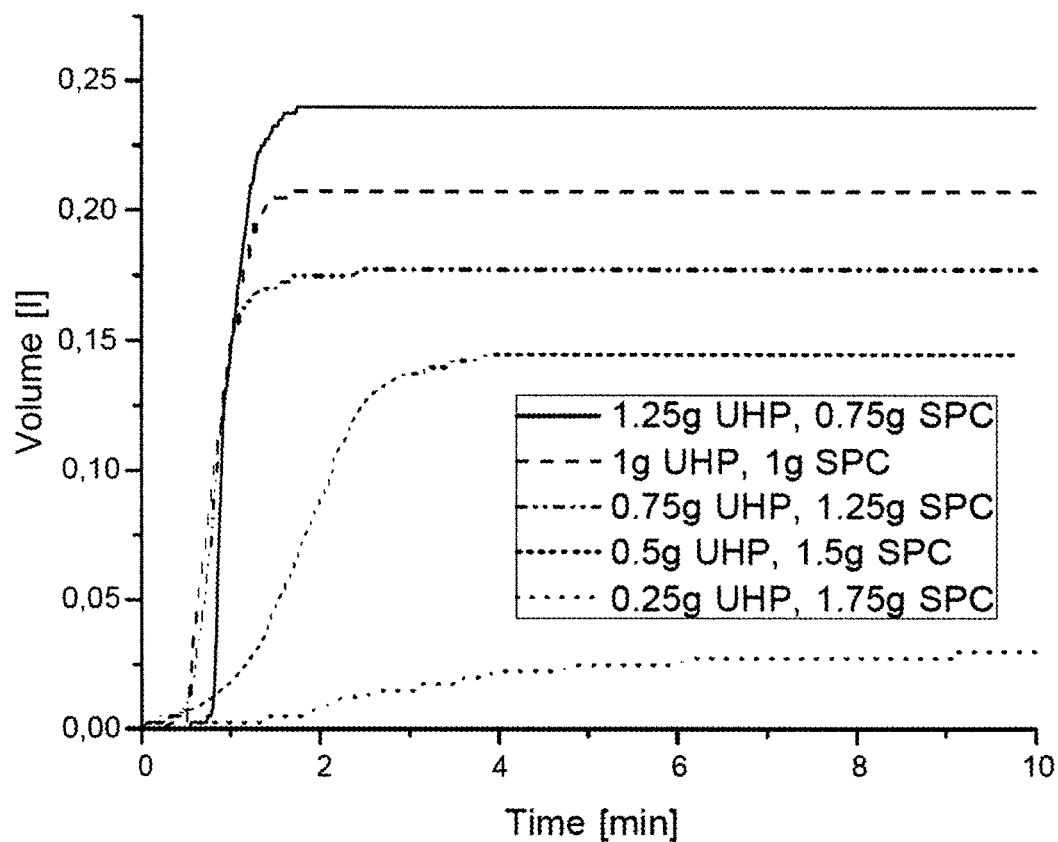
FIG. 13 is a graph illustrating oxygen release from mixtures of SPC and UHP in $MMIMPO_4Me_2$ by $CoSO_4$.

Mixtures of UHP and sodiumpercarbonate (SPC) in the amounts listed in table 9 (total amount 2.0 g) were added to solutions of $CoSO_4$ in 1 g $MMIMPO_4Me_2$. Then, the reaction vessel was closed, and the oxygen volume released by the decomposition reaction was measured with a drum gas meter. The results are illustrated in FIG. 13.

In the same manner, 2.00 g SPC was added to a solution of 107.4 mg $CoSO_4$ in 1 g BMIMOAc (2 mol % catalyst relative to SPC). The reaction profile is shown in FIG. 14.

TABLE 9

| mass UHP | masse SPC | mass catalyst | volume | time |
|---|---|---|---|---|
| 1.25 g | 0.75 g | 13.4 mg | 240 ml | 0.98 min |
| 1.00 g | 1.00 g | 13.4 mg | 210 ml | 1.14 min |
| 0.75 g | 1.25 g | 13.4 mg | 180 ml | 1.44 min |
| 0.50 g | 1.50 g | 13.4 mg | 145 ml | 2.23 min |
| 0.25 g | 1.75 g | 13.4 mg | 30 ml | 10 min |
| / | 2.00 g | 107.4 mg | 32 ml | 840 min |

Figure 14:
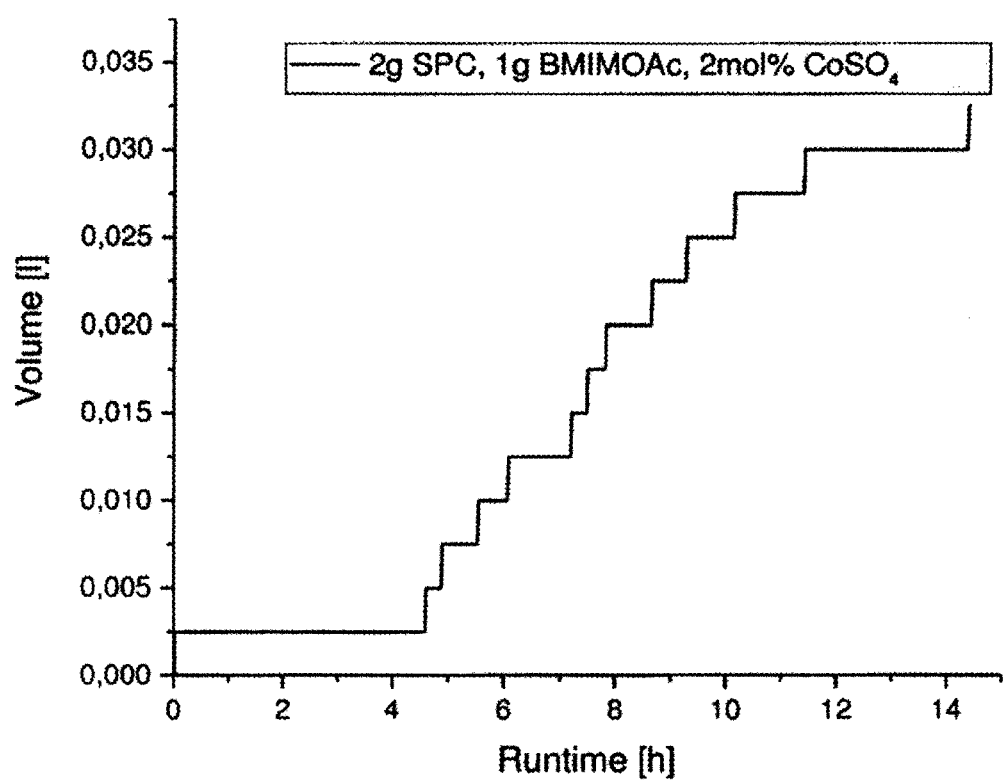
FIG. 14 is a graph illustrating oxygen release from SPC in BMIMOAc by $COSO_4$.

It is evident from FIGS. 13 and 14, that the nature of the peroxide compound influences the velocity of the decomposition reaction, and the amount of oxygen released. As an oxygen source, UHP is clearly preferable over SPC, since the amount of oxygen released increases with increasing UHP ratio.

Example 10

Figure 15:
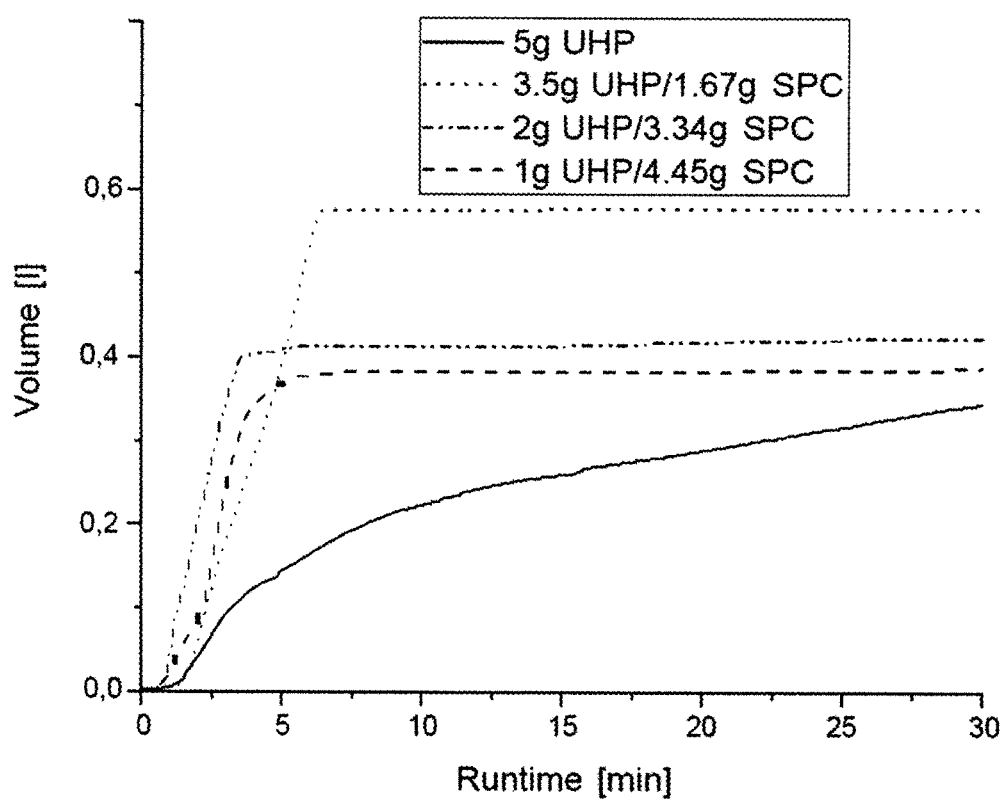
FIG. 15 is a graph illustrating oxygen release from UHP and from mixtures of UHP and SPC in BMIMOAc by $Mn(OAc)_3$.

Urea hydrogen peroxide (UHP) and mixtures of UHP and sodiumpercarbonate (SPC) in the amounts listed in table 10 were added to solutions of 35.6 mg (0.5 mol % relative to the peroxide compound) Mn(OAc)$_3$ in 2.5 g BMIMOAc. Then, the reaction vessel was closed, and the oxygen volume released by the decomposition reaction was measured with a drum gas meter. The results are illustrated in FIG. 15.

In the same manner, 2 g SPC were added to a solution of 105.9 mg (2 mol % relative to SPC) Co(OAc)$_2$ in 1 g BMIMOAc. The reaction profile is shown in FIG. 16.

TABLE 10

| mass UHP | mass SPC | mass catalyst | volume | tim |
|---|---|---|---|---|
| 5 g | / | 35.6 mg | 365 ml | >30 min |
| 3.5 g | 1.67 g | 35.6 mg | 580 ml | 5.08 min |
| 2 g | 3.34 g | 35.6 mg | 425 ml | 3.08 min |
| 1 g | 4.45 g | 35.6 mg | 390 ml | 4.52 min |

Figure 16:
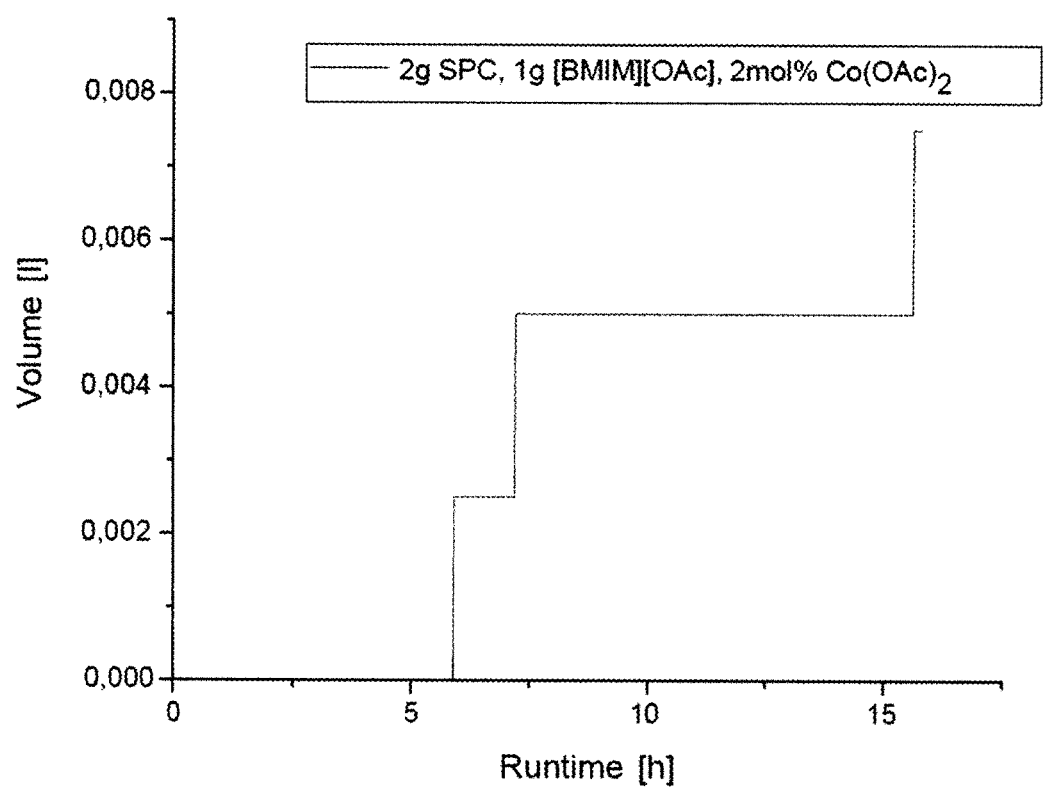
FIG. 16 is a graph illustrating oxygen release from SPC in BMIMOAc by $Co(OAc)_2$.

It is evident from FIGS. 15 and 16 that the nature of the peroxide compound influences the course of the decomposition reaction. In principle, it appears that UHP as an oxygen source is preferable over SPC because the amount of oxygen released increases with increasing UHP ratio. From pure UHP, however, less oxygen is released than from mixtures of UHP and SPC. At least, the reaction speed is considerably delayed.

Example 11

In a first experiment, 10 g UHP in powder form were added to a solution of 1.25 mol % (relative to UHP) Mn(OAc)$_3$ in 5 g BMIMOAc contained in a glass flask.

In a second experiment, 4 g UHP powder, which was used in experiment 1, were substituted by compressed (compaction pressure about 220 MPa) UHP tablets weighing 1 g each. The tablets and 6 g of the same UHP powder of experiment 1 were added to a solution of Mn(OAc)$_3$ in BMIMOAc, as used in experiment 1.

In a third experiment, 6 g of the same UHP powder, which was used in experiment 1, were substituted by compressed (compaction pressure about 220 MPa) UHP tablets weighing 1 g each. The tablets and 4 g of the same UHP powder which was used in experiment 1, were added to a solution of Mn(OAc)$_3$ in BMIMOAc, as used in experiment 1.

Figure 17:
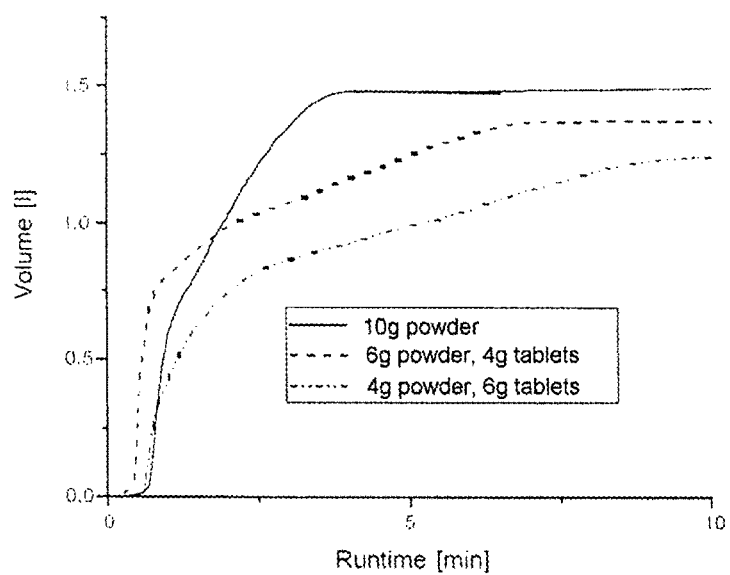
FIG. 17 illustrates oxygen release from UHP powder and from mixtures of UHP powder and UHP powder compacts in BMIMOAc by $Mn(OAc)_3$.

The flasks were closed, and the oxygen volumes released by the decomposition reactions were measured with a drum gas meter. The results are shown in table 11 and FIG. 17.

TABLE 11

| peroxide adduct | mass peroxide | mas | mass | volume | time |
|---|---|---|---|---|---|
| UHP | 1 powder | 5 | 229.8 mg | 1500 ml | 3.71 min |
| UHP | 10 g (4 g tablets) | 5 | 229.8 mg | 1380 ml | 7.08 min |
| UHP | 10 g (6 g tablets) | 5 | 229.8 mg | 1245 ml | 9.10 min |

The reaction speed was reduced and the time of oxygen production was somewhat extended, respectively, by compacting the hydrogen peroxide adduct compound.

Example 12

In this example, inorganic metal salts, which were insoluble in the respective ionic liquids of the compositions for generating oxygen, were used.

2.0 g UHP were added to dispersions of different metal salts in 1.0 g ionic liquid contained in a glass flask. The flask was closed, and the oxygen volume released by the decomposition reaction was measured with a drum gas meter. The ionic liquids and the type and amounts of catalysts used are listed in table 12, and the reaction profiles are shown in FIG. 18.

TABLE 12

| peroxide adduct | catalyst | mass catalyst | Ionic IL | volume |
|---|---|---|---|---|
| UHP | KCr(SO$_4$)$_2$ | 212.3 mg | [BMIM][OAc] | 580 ml |
| UHP | PbSO$_4$ | 193.5 mg | [BMIM][OAc] | 210 ml |
| UHP | VCl$_2$ | 103.6 mg | [BMIM][OAc] | 440 ml |
| UHP | CuCl | 57.2 mg | [MMIM][PO$_4$Me$_2$] | 460 ml |
| UHP | FePO$_4$ | 21.8 mg | [BMIM][OAc] | 12.5 ml |

Figure 18:
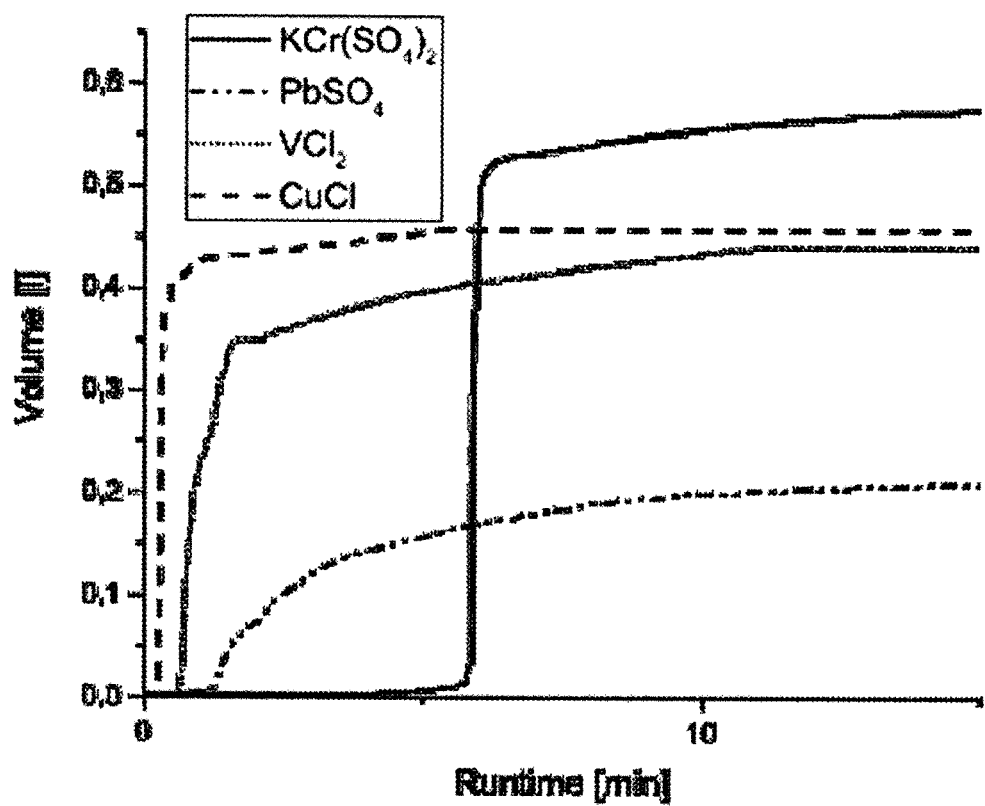
FIG. 18 illustrates oxygen release from UHP in BMIMOAc and $MMIMPO_4Me_2$ by different insoluble or partially soluble inorganic metal salts.

FIG. 18 reveals that the insoluble metal salt catalysts behave similar to the soluble metal salt catalysts. The onset of the decomposition reaction, the reaction velocity, and the total amount of oxygen released depend on the particular catalyst used.

Example 13

In this example, organic metal salts, which were insoluble in the ionic liquid of the composition for generating oxygen, were used.

2.0 g UHP were added to dispersions of different metal salts in 1.0 g MMIMPO$_4$Me$_2$ contained in a glass flask. The flask was closed, and the oxygen volume released by the decomposition reaction was measured with a drum gas meter. The type and amounts of the catalysts used are listed in table 13, and the reaction profiles are shown in FIG. 19.

TABLE 13

| peroxide adduct | catalyst | mass catalyst | mass IL | volume |
|---|---|---|---|---|
| UHP | Pb(acac)$_2$ | 172.4 mg | [MMIM][PO$_4$Me$_2$] | 180 ml |
| UHP | Pb(OAc)$_2$·2Pb(OH)$_2$ | 171.7 mg | [MMIM][PO$_4$Me$_2$] | 255 ml |
| UHP | Ru(acac)$_3$ | 65.0 mg | [MMIM][PO$_4$Me$_2$] | 280 ml |

Figure 19:
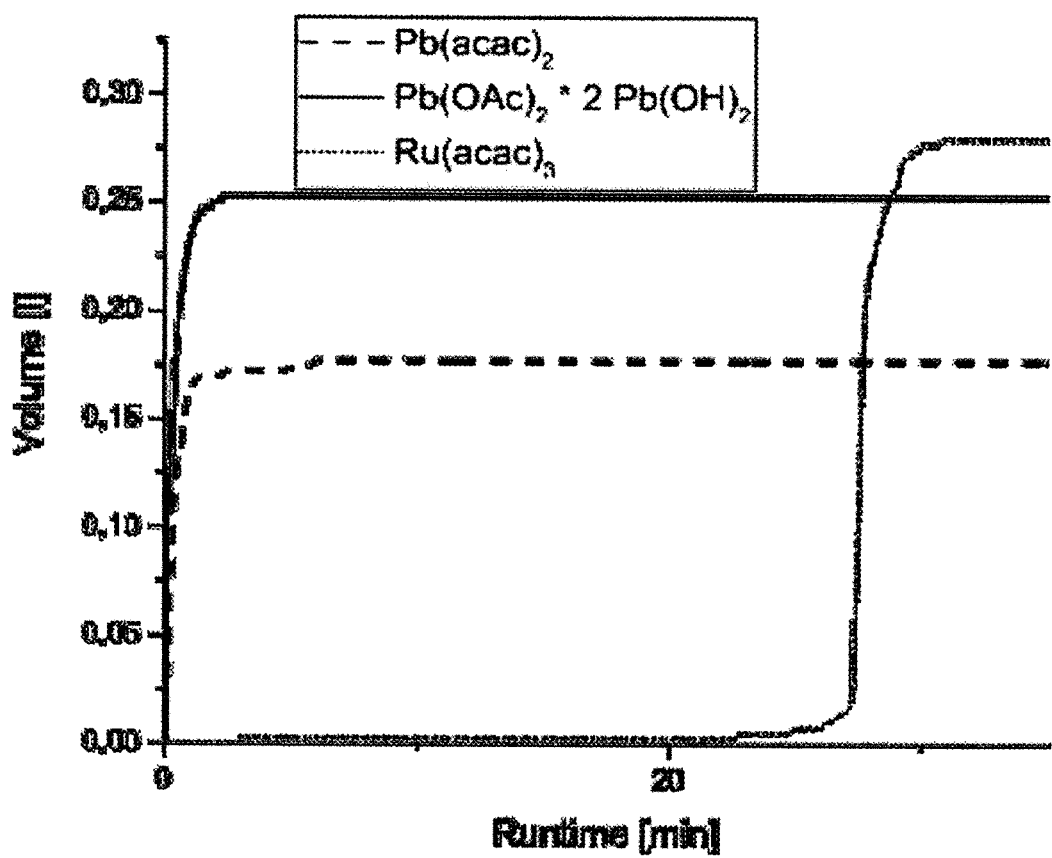
FIG. 19 illustrates oxygen release from UHP in $MMIMPO_4Me_2$ by different insoluble or partially soluble organic metal salts, and FIGS. 20 to 24 schematically illustrate several embodiments of devices for generating oxygen from compositions according to the invention.

FIG. 19 reveals that the insoluble metal salt catalysts behave similar to the soluble metal salt catalysts. The onset of the decomposition reaction and the total amount of oxygen released depend on the particular catalyst used.

An exemplary device for generating oxygen from compositions as described above which use ionic liquids for dissolving or dispersing a hydrogen peroxide adduct compound as an oxygen source, and for dispersing or dissolving a catalyst and bringing the catalyst into contact with the oxygen source, is specifically designed. An exemplary device for generating oxygen has at least one reaction chamber for storing the composition in a condition where not all constituents of the composition are in physical contact. Such physical contact of all constituents of the composition is established at the very moment when oxygen is required. The device is equipped with suitable means for allowing the constituents to contact each other at that very moment. Furthermore, the device allows that the generated oxygen exits the reaction chamber. Some exemplary devices are illustrated in FIGS. 20 to 24, wherein like reference numerals designate like components. The description of such exemplary embodiments shall not be construed as limiting the invention in any manner.

Figure 20:
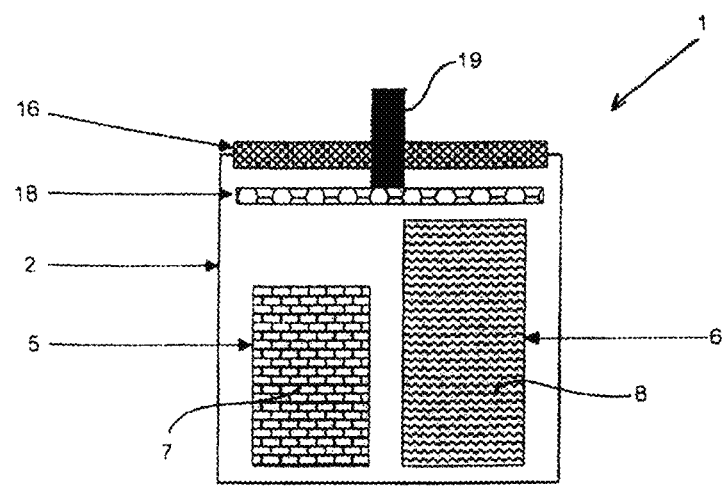

FIG. 20 illustrates an exemplary device for generating oxygen 1 having one single reaction chamber 2 for storing the composition for generating oxygen. In such a single reaction chamber 2 at least one of the constituents of the composition for generating oxygen must be enclosed in a receptacle in order to avoid contact with the remaining constituents of the composition contained in the reaction chamber 2. In the embodiment shown in FIG. 20, two receptacles 5, 6 are arranged in the reaction chamber. Receptacle 5 contains an intimate mixture of the oxygen source 7 and the decomposition catalyst 9, for example in powder form or compressed into pellets, in a thoroughly dried condition. Receptacle 6 contains the ionic liquid 8. Alternatively, there may be only one receptacle for enclosing the peroxide/catalyst mixture, while the ionic liquid is "free" within reaction chamber 2, or ionic liquid 8 may be enclosed within a receptacle, while the peroxide/catalyst mixture is not enclosed in a separate receptacle. Further alternatively, the catalyst may be dissolved (soluble metal salts) or partly dissolved (partly soluble metal salts) or dispersed (insoluble metals salts) in the ionic liquid. The alternative is particularly advantageous. It is, in principle, also possible to enclose only the catalyst within a separate receptacle, while the ionic liquid and the peroxide are not enclosed. It is only necessary to avoid contact between all three constituents during storage of the device for generating oxygen.

It is desirable to store the peroxide 7, the ionic liquid 8 and the catalyst 9 within the reaction chamber 2 in such an arrangement that all constituents will be able to get intimately mixed once oxygen generation is required. When, for example, an insoluble or only partly soluble metal salt is used as a catalyst, and this catalyst and the ionic liquid are provided in one receptacle, and the peroxide in another receptacle, the catalyst may settle within the ionic liquid during storage. In such a case proper mixing with the peroxide may be inhibited. Quick and perfect mixing of all constituents can be achieved when the peroxide and the soluble or insoluble catalyst are intimately mixed in advance in a dry condition, optionally compacted into moulds, and filled either into the reaction chamber 2 or into a separate receptacle 5 to be placed within the reaction chamber 2, and the ionic liquid is provided in a separate receptacle 6. Quick and perfect mixing can also be achieved when the catalyst is soluble in the ionic liquid, and is essentially dissolved therein. Placing the ionic liquid (or the ionic liquid and the catalyst) in a separate receptacle, although this is not absolutely necessary in a case where peroxide and catalyst (or the peroxide alone) are placed in a receptacle 5, constitutes an advantageous precautionary measure against accidental mixing of the constituents in case of receptacle 5 leakage or breakage. Care must be taken, when UHP and catalyst are mixed, because UHP is highly hygroscopic.

In a situation where oxygen shall be generated, receptacle 5, or receptacles 5 and 6, respectively, are destroyed by a breaking device 18. In FIG. 20, breaking device 18 has the form of a plate, however, means for destroying the receptacle(s) are not limited to plates, and other means are known to persons skilled in the art, for example firing pins or grids. Movement of plate 18 can be achieved by a spring 19 or another activation mechanism. During storage of the device for generating oxygen, spring 19 is under tension and holds plate 18 at a position distant from receptacles 5, 6. Once the tension is released by a suitable trigger mechanism (not shown), spring 19 moves plate 18 towards receptacles 5, 6, and plate 18 destroys receptacles 5, 6. Such a trigger may be, for example, pulling an oxygen mask towards a passenger in an airplane. Another exemplary trigger mechanism is an oxygen sensor sensing a low oxygen condition.

Receptacles 5, 6, and plate 18 are made from materials which guarantee that receptacles 5, 6 will be broken or ruptured when hit by plate 18. Exemplary materials are plastic foils or glass for receptacles 5, 6, and thicker plastic material or metal for plate 18.

Destruction of receptacles 5, 6 causes mixing of peroxide, ionic liquid, and catalyst, and initiates oxygen generation. In order to allow that the oxygen exits reaction chamber 2, reaction chamber 2 has an opening. In the illustrated embodiment, the opening is sealed with a gas permeable membrane 16. The opening may be at a different position than shown in FIG. 20, or there may be more than one opening. This applies analogously to all devices for generating oxygen of the invention.

In exemplary embodiments, the oxygen generated in the devices of this invention may be passed through a filter or other purification means as known in the art. The devices may be equipped with such means.

The oxygen generating reaction is an only slightly exothermic process, and proceeds at low temperature, i.e. below 150° C., or even below 120° C. or below 100° C. Therefore, reaction chamber 2 does not need to resist high temperatures, and may be made from lightweight, low melting materials such as plastic. In addition, any bulky insulation is not required. This is particularly advantageous in all cases where weight must be saved and/or space is limited, for example in the case of oxygen masks which shall be installed in an aircraft.

Figure 21:
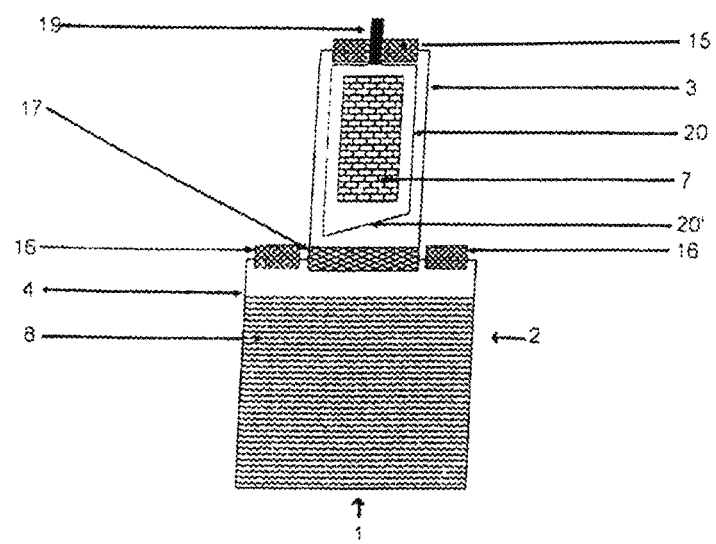

FIG. 21 illustrates an alternative embodiment of an exemplary device 1 for generating oxygen. In the exemplary embodiment of FIG. 21, the reaction chamber 2 has two compartments, a first compartment 3, and a second compartment 4, which are separated by a gastight membrane 17. The first compartment 3 contains one or more constituents of the composition for generating oxygen. Compartment 3 is equipped with a cutting device 20 having cutting edge 20', and the cutting device is arranged in a position that allows cutting edge 20' to cut through membrane 17 separating the first compartment 3 and the second compartment 4.

Compartments 3, 4 have openings sealed by membranes 15 and 16, respectively. Membranes 15, 16 are gas permeable, thus allowing the oxygen generated during the oxygen generating reaction to exit reaction chamber 2.

An activation mechanism 19, for example a spring, is provided for moving cutting device 20 towards membrane 17, and through membrane 17. Such a mechanism is described in DE 10 2009 041 065 A1. As explained in connection with FIG. 20, spring 19 is under tension during storage of device 1, and once the tension is released by a trigger mechanism (not shown), spring 19 moves receptacle 5 towards membrane 17, cutting edge 20' destroys membrane 17, and first compartment 3 and second compartment 4 are combined into one single reaction chamber 2.

In the exemplary embodiment illustrated in FIG. 20, a mixture of peroxide 7 and catalyst 9 is contained in the first compartment 3, and ionic liquid 8 is contained in second compartment 4. Upon destruction of membrane 17, the peroxide/catalyst formulation falls into the second compartment 4, and mixes with ionic liquid 8. The oxygen generated exits the reaction chamber 2 through membranes 15, 16.

Of course, it is also possible to place ionic liquid 8 into the first compartment 3 and the peroxide/catalyst formulation into the second compartment 4, or to use any other arrangement wherein at least one of the constituents is separated from the remaining constituents. For example, the catalyst may be provided in the form of a solution, i.e. dissolved in the ionic liquid.

As a material for the cutting device 20, any material may be used which may cut membrane 17, for example a metal sheet. The first compartment 3 and the second compartment 4 can be formed from the same materials as the single reaction chamber 2 illustrated in FIG. 20.

Figure 22:
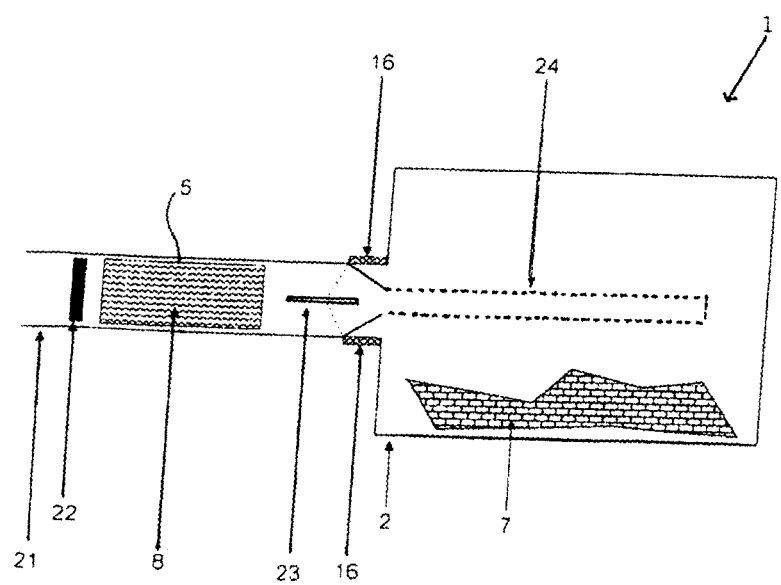

Another exemplary embodiment of an inventive device 1 for generating oxygen is illustrated in FIG. 22. In the embodiment of FIG. 22, the reaction chamber 2 is equipped with an injection device 21, for example a syringe or another dosing device.

Reaction chamber 2 and injection device 21 are connected, or constitute separate units which can be connected, to form one single unit. An opening, or several openings, in the wall of reaction chamber 2 allow that oxygen generated during the peroxide decomposition reaction exits reaction chamber 2. The openings are sealed in the embodiment shown by gas permeable membranes 16. In the exemplary embodiment illustrated in FIG. 22, the openings are provided at the junction of reaction chamber 2 and injection device 21.

The exemplary injection device of FIG. 22 comprises a slide bar 22, a spike 23, and an injection lance 24. The injection device is adapted for holding one or several constituents of the composition for generating oxygen, in the illustrated example the ionic liquid 8. Ionic liquid 8 is contained in a receptacle 5 made from a material which can be easily ruptured, for example a bag made from a plastic foil. A mixture of peroxide 7 and catalyst 9 is contained in reaction chamber 2. Alternatively, catalyst 9 may be contained in ionic liquid 8, dissolved or partly dissolved or dispersed therein, depending on the solubility of the inorganic or organic metal salt in the ionic liquid. In a device as illustrated in FIG. 22, any settlement of the catalyst within the ionic liquid during storage does not constitute a disadvantage because the catalyst will be re-dispersed during the injection step.

In the exemplary embodiments, slide bar 22 can be actuated in an analogous manner as the breaking device 18 in FIG. 20, and the cutting device 20 in FIG. 21. Once actuated, slide bar 22 pushes receptacle 5 towards spike 23, receptacle 5 is ruptured, and ionic liquid 8 is injected through injection lance 24 into reaction chamber 2. Preferably, injection lance 24 is provided with several holes (not shown) in order to provide uniform distribution of ionic liquid 8. Ionic liquid 8 soaks the mixture of peroxide 7 and catalyst 9, or alternatively the mixture or solution of ionic liquid 8 and catalyst 9 soaks peroxide 7, and the peroxide decomposition reaction starts, generating oxygen. The oxygen leaves reaction chamber 2 via membranes 16.

Analogously to the embodiments described above, the arrangement of peroxide 7, ionic liquid 8, and metal salt catalyst 9 may be different from the arrangement illustrated in FIG. 22. In particular, if not a liquid, but solid matter is contained in the injection device or dosing unit 21, no receptacle 5 is required, and means for destroying the receptacle, such as spike 23, and an injection lance are also not required.

Figure 23:
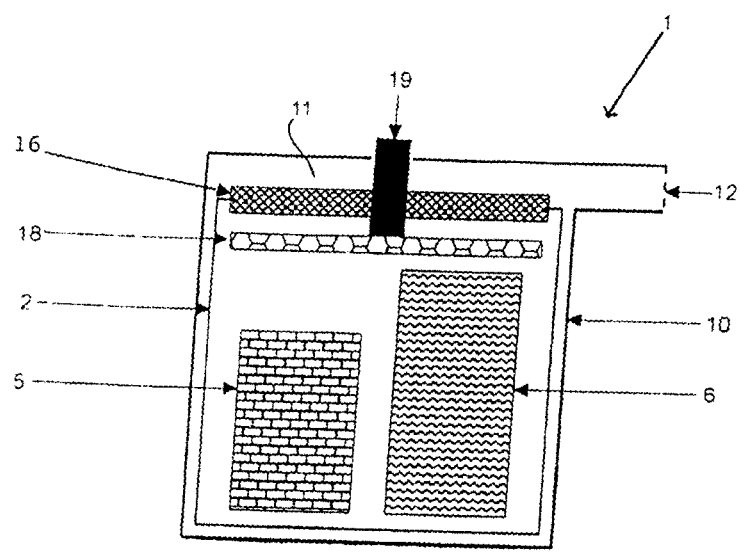

FIG. 23 depicts an exemplary embodiment of the device 1 for generating oxygen which is similar to the embodiment depicted in FIG. 20. Different from the embodiment of FIG. 20, the device for generating oxygen of FIG. 23 is contained in a container 10 surrounding and protecting reaction chamber 2. In this case, the oxygen generated is not directly released into the environment, but rather enters into a gas space 11 between gas permeable membrane 16 and an upper wall of container 10. The oxygen exits gas space 11 via a gas outlet 12 which may be, for example, provided with a filter.

A device 1 as shown in FIG. 23 typically does not need any further thermal insulation. Rather, container 10 provides for sufficient insulation. If desired, a thin layer (for example, having a thickness of about 1 to 3 mm) of an insulating material may be placed between the outer wall of reaction chamber 2 and the inner wall of container 10. Such an insulating material may also serve the additional purpose of holding reaction chamber 2 tightly fixed in place within container 10. No insulating material should be provided between membrane 16 and the container wall opposite to membrane 16, i.e. in gas space 11.

Housing the reaction chamber within a container is advantageous both in devices for generating oxygen having only one reaction chamber, and in devices for generating oxygen having more than one reaction chamber, for example two reaction chambers or a plurality or multitude of reaction chambers 2. An embodiment having eight reaction chambers 2 is illustrated in FIG. 24.

Figure 24:
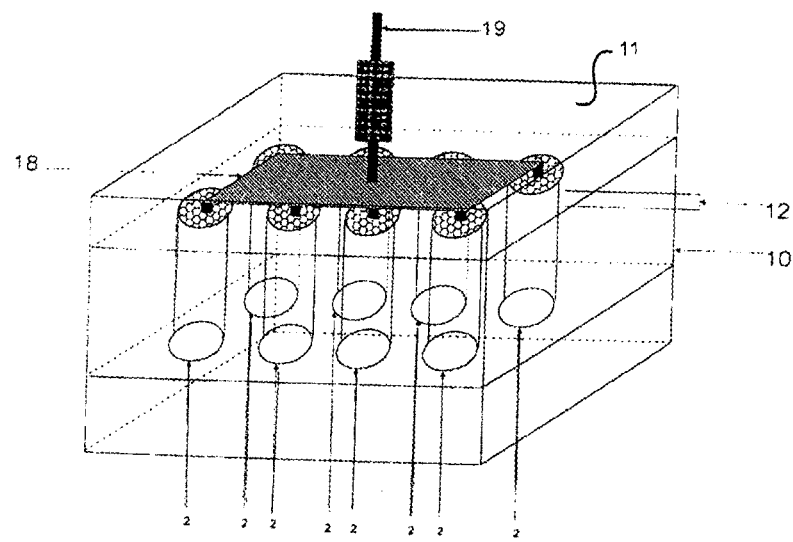

In the exemplary device for generating oxygen illustrated in FIG. 24, reaction chambers 2 are shown schematically. Generally, the construction of reaction chambers 2 is not limited in any manner. For example, reaction chambers as illustrated in FIGS. 20 to 22 can be used. Furthermore, the arrangement of the reaction chambers is not limited to the arrangement shown in FIG. 24. Rather, the reaction chambers may be arranged within the container 10 in any appropriate manner.

Oxygen generation within reaction chambers 2 is initiated upon activation of reaction chambers 2. In the exemplary embodiment shown in FIG. 24, all reaction chambers 2 are activated simultaneously by a common activation mechanism 19, such as a spring, designed for pushing a plate 18 towards reaction chambers 2, as described in connection with FIG. 20. Alternatively, each reaction chamber may be activated individually, i.e. may have its own activation mechanism, or several reaction chambers may be arranged to groups, each group having its own activation mechanism. For example, in the embodiment of FIG. 24, the eight reaction chambers might be arranged into two groups of four chambers, each group having its own activation mechanism.

Container 10 provides a gas space 11 receiving oxygen from all reaction chambers 2, and the oxygen collected within gas space 11 exits gas space 11 via gas outlet 12. Alternatively, gas space 11 may be divided into a plurality of compartments. A separate compartment, having its own gas outlet, may be attributed to each reaction chamber 2, or one compartment may provide a common gas space for a group of reaction chambers 2. For example, container 10 may provide two gas spaces 11, and each gas space 11 may collect oxygen from four reaction chambers 2.

A device for generating oxygen having several reaction chambers 2 allows to extend oxygen generation over a long time span. As explained above, the reaction time of the peroxide decomposition reaction as well as the onset of the decomposition reaction can be manipulated by choosing appropriate metal salts as catalysts, by varying catalyst amounts and, in particular, by minimizing or maximizing the accessible surface area of the peroxide compound, for example by milling the peroxide compound to a fine powder or by pressing the peroxide compound into powder compacts. The higher the compacting pressure, the higher the density of the resulting powder compacts will be, thus minimizing the accessible surface area of the peroxide compound.

In the exemplary device illustrated in FIG. 24, each of the eight reaction chambers 2 may be charged with a different composition for generating oxygen. A first chamber may be charged, for example, with a composition comprising the peroxide compound in fine powdered form, and a high catalyst concentration. This chamber will generate oxygen immediately upon activation, and with a high reaction rate. Thus, breathable oxygen will be available immediately, but only for a short time span.

Three further reaction chambers 2 may be charged also with peroxide compound in fine powdered form, and with catalyst concentrations decreasing from chamber to chamber. In these reaction chambers oxygen generation will be slower, thus extending the time span wherein breathable oxygen is available.

The remaining four reaction chambers may be charged with peroxide compound which has been pressed into powder compacts, the compacting pressure increasing from chamber to chamber. In these chambers, the onset of the decomposition reaction will be delayed, the delay increasing with increasing compaction pressure. In another embodiment, the remaining four reaction chambers may be charged with peroxide compound both in powder and in compressed form, with an increasing ratio of powder compacts. This measure further extends the time span wherein breathable oxygen is available.

A similar result can be achieved with only one reaction chamber 2 by charging the single reaction chamber with different oxygen generating compositions, for example with different metal salts as catalyst and/or with oxygen sources in powder form and/or compressed with different compacting pressures.

Since the decomposition reactions are scalable to different reactor sizes, it is easily possible to charge an oxygen generating device according to this invention with an oxygen generating composition in a sufficient amount to provide for the desired oxygen flow rate. For emergency systems it is generally desired to produce at least 4 l oxygen per minute.

Of course, also different numbers of reaction chambers than those disclosed by way of example can be advantageously used.

The devices for generating oxygen of this invention may be designed as disposable devices (single use) filled with a composition for generating oxygen or compositions for generating oxygen, respectively, or as reusable devices which can be recharged after use with another composition for generating oxygen. Therefore, the constituents of the compositions for generating oxygen can be provided in the form of components suitable for recharging a device for generating oxygen, for example in cartridges.

In an exemplary embodiment, one component comprises a metal salt formulation and an ionic liquid formulation, and another component comprise an oxygen source formulation.

In an alternative exemplary embodiment, one component comprises an oxygen source formulation and an ionic liquid formulation, and another component comprises a metal salt formulation.

In another exemplary embodiment one component comprises an oxygen source formulation and a metal salt formulation, and another component comprises an ionic liquid formulation.

In a further exemplary embodiment, one component comprises an oxygen source formulation, another component comprises an ionic liquid formulation, and still another component comprises a metal salt formulation.

The term "oxygen source formulation" means that the oxygen source may be one single peroxide compound, but may be as well a combination of two or more peroxide compounds, and may optionally contain any additives not detrimentally interacting with the peroxide decomposition reaction.

The term "ionic liquid formulation" means that the ionic liquid may be one single ionic liquid, but may be as well a combination of two or more ionic liquids, and may optionally contain any additives not detrimentally interacting with the peroxide decomposition reaction. The ionic liquids themselves shall not react with any of the constituents of the compositions for generating oxygen, or with any intermediate products generated during the decomposition reaction.

The term "metal salt formulation" means that the catalyst may be one single metal salt, but may be as well a combination of two or more metal salts, and may optionally contain any additives not detrimentally interacting with the peroxide decomposition reaction. The metal salts are salts having organic and/or inorganic anions, and are soluble, partly soluble, or insoluble in the ionic liquid (formulation).

The devices for generating oxygen according to the present invention are not sensitive to interruptions of the oxygen production process, in contrast to chlorate candles which can be easily destabilized, for example by shaking. Shaking a device for generating oxygen according to the present invention enhances mixing of the constituents of the oxygen generating composition and, therefore, promotes the oxygen generation reaction.

In embodiments wherein the metals salt is provided in a dissolved state, i.e. dissolved in the ionic liquid, there is the additional advantage that even during long term storage no sedimentation of the metal salt can be take place. The catalyst remains homogenously distributed in the ionic liquid, and contacts the peroxide compound at the very moment when the ionic liquid contacts the peroxide compound.

The inventive devices can be construed in such a manner that the orientation of the inventive devices for generating oxygen in the gravity field of the earth is arbitrary. To this end, several oxygen outlets (sealed by gas permeable membranes or other structures allowing passage of oxygen, while blocking passage of non gaseous substances) must be provided in the walls of reaction chamber(s) 2, and the openings must be arranged in such a manner, that there is always an opening which is not covered by ionic liquid, irrespective of the orientation of the device.

The oxygen produced according to this invention is pure and at a low temperature and, therefore, ideal for applications such as self-rescuers. The use for technical purposes such as in portable welding devices and control nozzles, however, is also contemplated.

The invention claimed is:

1. A device for generating oxygen comprising:
   a combination of constituents consisting of at least one oxygen source, at least one ionic liquid, and at least one metal salt;
   at least one reaction chamber;
   means for maintaining at least one of the oxygen source, the ionic liquid and the metal salt physically separated from the remaining constituents;
   means for establishing physical contact of the oxygen source, the ionic liquid and the metal salt, wherein the oxygen source, the ionic liquid, and the metal salt, upon coming into contact with one another in the at least one reaction chamber, generate breathable oxygen; and
   means for allowing the breathable oxygen to exit the reaction chamber;
   wherein the metal salt comprises a single metal or two or more different metals, and an organic and/or an inorganic anion; and
   wherein the oxygen source comprises a peroxide compound.

2. The device according to claim 1, wherein the oxygen source is selected from: alkali metal percarbonates, alkali metal perborates, urea hydrogen peroxide, and mixtures thereof.

3. The device according to claim 1, wherein the oxygen source is one or more of $Na_2CO_3 \times 1.5H_2O_2$, $NaBO_3 \times 4H_2O$, $NaBO_3 \times H_2O$ and urea hydrogen peroxide.

4. The device according to claim 1, wherein the ionic liquid is at least one salt having a cation and an anion, wherein the cation is selected from the group consisting of: imidazolium, pyrrolidinium, ammonium, pyridinium, pyrazolium, piperidinium, phosphonium, and sulfonium cations.

5. The device according to claim 1, wherein the ionic liquid is at least one salt having a cation and an anion, wherein the anion is selected from the group consisting of: dimethylphosphate, methylsulfate, ethylsulfate, trifluoromethyl-sulfonate, bis(trifluoromethylsulfonyl)imide, chloride, bromide, iodide, tetrafluoroborate, hexafluorophosphate, acetate, and but-3-enoate.

6. The device according to claim 1, wherein the ionic liquid is selected from the group consisting of:
   1-butyl-3-methylimidazoliumdimethylphosphate ($BMIMPO_4Me_2$),
   1,3-dimethylimidazoliumdimethylphosphate ($MMIMPO_4Me_2$),
   1-butyl-3-methylimidazoliumacetate (BMIMOAc),
   1-ethyl-3-methylimidazoliumethylsulfate ($EMIMEtSO_4$), and
   tetraethylammonium but-3-enoate ($NEt_4$but-3-enoate).

7. The device according to claim 1, wherein the metal salt is soluble or partially soluble, or insoluble in the ionic liquid.

8. The device according to claim 1, wherein the metal salt contains one single metal, the metal being selected from the metals belonging to groups 5 to 14 and periods 4 to 6 of the periodic table of the elements.

9. The device of claim 8, wherein the metal has different oxidation states.

10. The device according to claim 1, wherein the metal salt comprises at least two different metals, with at least one metal being selected from the metals belonging to groups 5 to 14 and periods 4 to 6 of the periodic table of the elements.

11. The device according to claim 1, wherein the metal salt comprises at least one cation selected from the group consisting of vanadium, chromium, manganese, iron, cobalt, copper, molybdenum, ruthenium, iridium, and lead.

12. The device according to claim 1, wherein the metal salt is selected from the group consisting of: chlorides, sulfates, carbonates, nitrates, phosphates, hydroxides, and mixtures thereof, or from the group consisting of acetates, acetylacetonates, oxalates, tartrates, citrates, and mixtures thereof.

13. The device according to claim 1, as a component unit of a self-rescuer, a rebreather, a welding device or a control nozzle.

* * * * *